US 7,341,121 B2

(12) United States Patent
Flowers et al.

(10) Patent No.: US 7,341,121 B2
(45) Date of Patent: Mar. 11, 2008

(54) VEHICLE WITH IMPROVED TURNING

(75) Inventors: Michael J. Flowers, Mantua, NJ (US); Stephen Jarema, III, Pittsgrove, NJ (US); Edward J. Dwyer, Jr., Pittsgrove, NJ (US); Robert C. Hopely, Jr., Sewell, NJ (US); David S. Zaveloff, Bordentown, NJ (US); Robert M. Martin, Holland, PA (US)

(73) Assignee: Electric Mobility Corp, Sewell, NJ (US)

( * ) Notice: Subject to any disclaimer, the term of this patent is extended or adjusted under 35 U.S.C. 154(b) by 0 days.

(21) Appl. No.: 11/020,173

(22) Filed: Dec. 27, 2004

(65) Prior Publication Data
US 2005/0151334 A1 Jul. 14, 2005

Related U.S. Application Data

(60) Provisional application No. 60/535,318, filed on Jan. 9, 2004.

(51) Int. Cl.
*B60K 23/04* (2006.01)
(52) U.S. Cl. .................... 180/6.66; 80/6.28
(58) Field of Classification Search ........ 180/6.26–6.4, 180/6.5, 6.66
See application file for complete search history.

(56) References Cited

U.S. PATENT DOCUMENTS

| 1,211,332 | A | 2/1917 | Mehrings |
| 2,896,693 | A | 7/1959 | Schladebach |
| 3,004,619 | A | 10/1961 | Straussler |
| 3,242,896 | A | 3/1966 | Kauffmann |
| 3,369,629 | A | 2/1968 | Weiss |
| 3,580,101 | A | 5/1971 | Jorgensen |
| 3,580,348 | A | 5/1971 | DiBiasi |
| 3,664,450 | A | 5/1972 | Udden et al. |
| 3,770,289 | A | 11/1973 | Dougherty et al. |
| 3,799,569 | A | 3/1974 | Baker |
| 3,945,449 | A | 3/1976 | Ostrow |
| 4,172,503 | A | 10/1979 | Ishioka et al. |
| 4,293,050 | A | 10/1981 | Goloff et al. |
| 4,351,540 | A | 9/1982 | Minnebraker |
| 4,452,327 | A | 6/1984 | Mowat et al. |

(Continued)

FOREIGN PATENT DOCUMENTS

GB 2072106 A * 9/1981

(Continued)

*Primary Examiner*—Kevin Hurley
(74) *Attorney, Agent, or Firm*—Frijouf, Rust & Pyle P.A.

(57) ABSTRACT

A vehicle is disclosed having a reduced turning radius comprising a directional wheel assembly for turning the vehicle and a drive wheel assembly for driving the vehicle. The drive wheel assembly has a first and a second drive wheel independently driven by a first and a second motor through a control circuit. A counter-rotation circuit counter-rotates the first and second drive wheels upon a major turning position of the directional wheel assembly to enhance the turning of the vehicle. A reducing circuit reduces the speed of the motors upon a minor turning position of the directional wheel assembly. The vehicle may include a slide mechanism for providing a reduced wheelbase to further reduce the turning radius of the vehicle. One embodiment of the invention includes an improved steering device for controlling the directional wheel assembly.

9 Claims, 31 Drawing Sheets

U.S. PATENT DOCUMENTS

| | | |
|---|---|---|
| 4,570,739 A | 2/1986 | Kramer |
| 4,613,151 A | 9/1986 | Kielczewski |
| 4,641,720 A | 2/1987 | Young |
| 4,721,321 A | 1/1988 | Haury et al. |
| 4,805,925 A | 2/1989 | Haury et al. |
| 4,834,409 A | 5/1989 | Kramer |
| 4,896,899 A | 1/1990 | Lawrence |
| 4,909,525 A | 3/1990 | Flowers |
| 5,011,175 A | 4/1991 | Nicholson |
| RE33,675 E | 8/1991 | Young |
| 5,094,310 A | 3/1992 | Richey et al. |
| 5,238,082 A | 8/1993 | Stegeman et al. |
| 5,259,470 A * | 11/1993 | Akahane et al. ............ 180/6.34 |
| 5,383,528 A | 1/1995 | Nicol |
| 5,439,252 A | 8/1995 | Oxley et al. |
| 5,481,937 A | 1/1996 | Uphaus et al. |
| 5,613,404 A | 3/1997 | Lykken |
| 5,816,614 A | 10/1998 | Kramer, Jr. et al. |
| 5,826,670 A | 10/1998 | Nan |
| 5,848,658 A | 12/1998 | Pulver |
| 5,890,397 A | 4/1999 | Stoner et al. |
| 5,890,558 A | 4/1999 | Keegan |
| 5,996,716 A | 12/1999 | Montiglio et al. |
| 6,050,593 A | 4/2000 | McConnell et al. |
| 6,092,822 A | 7/2000 | Salmon |
| 6,183,002 B1 | 2/2001 | Choi et al. |
| 6,301,534 B1 | 10/2001 | McDermott, Jr. et al. |
| 6,312,354 B1 | 11/2001 | Irikura |
| 6,331,013 B2 | 12/2001 | Choi et al. |
| 6,332,621 B1 | 12/2001 | Wu |
| 6,371,235 B1 | 4/2002 | Wisecarver |
| 6,386,305 B2 | 5/2002 | Nakakita et al. |
| 6,397,966 B1 | 6/2002 | Irikura |
| 6,434,917 B1 | 8/2002 | Bartel |
| 6,442,917 B1 | 9/2002 | Velke et al. |
| 6,447,419 B1 | 9/2002 | Irikura et al. |
| 6,474,689 B2 | 11/2002 | Mulhern et al. |
| 6,484,827 B2 | 11/2002 | Teal et al. |
| 6,523,635 B1 | 2/2003 | Johnston et al. |
| 6,524,205 B1 | 2/2003 | Irikura et al. |
| 6,531,838 B2 | 3/2003 | Parks |
| 6,540,633 B1 | 4/2003 | Hasegawa et al. |
| 6,601,663 B2 * | 8/2003 | Hauser ..................... 180/6.3 |
| 6,962,219 B2 * | 11/2005 | Hauser ..................... 180/6.34 |
| 2006/0000649 A1 * | 1/2006 | Witzenberger ............ 180/6.66 |

FOREIGN PATENT DOCUMENTS

| | | |
|---|---|---|
| GB | 2 201 588 A | 12/1987 |
| TW | 576810 * | 2/2004 |

* cited by examiner

VEHICLE WITH IMPROVED TURNING

CROSS-REFERENCE TO RELATED APPLICATIONS

This application claims benefit of U.S. Patent Provisional application Ser. No. 60/535,318 filed Jan. 9, 2004. All subject matter set forth in provisional application Ser. No. 60/535,318 is hereby incorporated by reference into the present application as if fully set forth herein.

BACKGROUND OF THE INVENTION

1. Field of the Invention

This invention relates to vehicles and more particularly to a vehicle having an improved turning radius.

2. Description of the Related Art

The popularity of personal mobility vehicles has dramatically increased over the last several decades. This increase in the popularity of personal mobility vehicles is due to many factors including the advent of new structural techniques and materials, as well as a more aging population. Although the population especially in the United States of America is moving towards a more senior age distribution, many of these seniors are very active and mobile. This desire for mobility and activity is present despite physical or health infirmities.

Personal mobility vehicles may be characterized as either scooter type personal mobility vehicles or power chair personal mobility vehicles. Each of the scooter type personal mobility vehicles and the power chair personal mobility vehicles have certain advantages and disadvantages.

A scooter personal mobility vehicle typically comprises an elongated frame having front wheel and plural rear wheels. The front wheel is pivotably mounted on the front portion of the elongated flame. A tiller and handlebar is provided for pivoting the front wheel for steering the personal mobility vehicle. The plural rear wheels are mounted on a common shaft driven by a single electric motor. The electric motor is controlled by a variable speed control and a forward and reverse located on the handlebar of the scooter. The scooter type personal mobility vehicle is well suited for unconfined areas such as outside use due to the superior ride of the elongated wheelbase of the scooter. The elongated wheelbase provides more stability and a better ride for the scooter personal mobility vehicle.

A power chair personal mobility vehicle typically comprises a short frame having plural drive wheels and plural casters or idler wheels. The plural drive may be either front or the rear drive wheels with the caster or idler wheels providing the stability for the power chair. The plural drive wheels are independently driven by plural electric motors. The plural electric motors are independently controlled by a control for independently driving the plural electric motors. A joystick operated the control for controlling both the turning as well as the forward and reverse movements of the power chair. The turning of the power chair was accomplished by a differential in speed between the plural independently driven electric motors. The control enabled one of the plural electric motors to have a reverse rotation relative to the other of the plural electric motors. The power chair personal mobility vehicle is well suited for confined areas such as inside use due to the short frame and the superior turning radius of the plural independently driven electric motors. The short wheelbase provides a reduced turning radius for the personal mobility vehicle for negotiating smaller confined spaces indoors.

Some in the prior art have attempted to utilize a variable wheelbase in a vehicle for improving the maneuverable and/or turning radius of the vehicle. The following United States Patents are some of the attempts of the prior art to utilize a variable wheelbase in a vehicle for increasing the maneuverability of a vehicle; U.S. Patent Re. 33,675 to Young; U.S. Pat. No. 2,896,693 to G. Schladebach; U.S. Pat. No. 3,004,619 to N. P. S. Straussler; U.S. Pat. No. 3,242,896 to R. Kauffmann; U.S. Pat. No. 3,369,629 to M. Weiss; U.S. Pat. No. 3,580,348 to R. Di Blasi; U.S. Pat. No. 3,664,450 to Udden et al.; U.S. Pat. No. 3,770,289 to L. W. Dougherty et al.; U.S. Pat. No. 3,945,449 to Ostrow; U.S. Pat. No. 4,351,540 to Minnebraker; U.S. Pat. No. 4,452,327 to Mowat et al.; U.S. Pat. No. 4,613,151 to Kielczewski; U.S. Pat. No. 4,721,321 to Haury et al.; U.S. Pat. No. 4,805,925 to Haury et al.; U.S. Pat. No. 4,834,409 to Kramer; U.S. Pat. No. 4,909,525 to Flowers; U.S. Pat. No. 5,011,175 to J. D. Nicholson et al.; U.S. Pat. No. 5,094,310 to Richey et al.; U.S. Pat. No. 5,826,670 to Nan; U.S. Pat. No. 5,848,658 to Pulver; U.S. Pat. No. 5,996,716 to Montiglio et al.; U.S. Pat. No. 6,092,822 to J. R. Salmon; U.S. Pat. No. 6,183,002 to 0. Choi et al.; U.S. Pat. No. 6,331,013 to O. Choi et al. and U.S. Pat. No. 6,371,235 to W. R. Wisecarver.

Others in the prior art have attempted to utilize independently controlled plural electric motors for improving the maneuverable and/or turning radius of a vehicle. The following United States Patents are some of the attempts of the prior art to utilize independently controlled plural electric motors for increasing the maneuverability of a vehicle; U.S. Pat. No. 4,293,050 to Goloff, et al.; U.S. Pat. No. 4,641,720 to Young; U.S. Pat. No. 5,383,528 to Nicol; U.S. Pat. No. 5,890,558 to Keegan; U.S. Pat. No. 6,301,534 to McDermott, Jr., et al.; U.S. Pat. No. 6,312,354 to Irikura, et al.; U.S. Pat. No. 6,386,305 to Nakakita, et al.; U.S. Pat. No. 6,397,966 to Irikura, et al.; U.S. Pat. No. 6,434,917 to Bartel; U.S. Pat. No. 6,442,917 to Velke, et al.; U.S. Pat. No. 6,447,419 to Irikura, et al.; U.S. Pat. No. 6,484,827 to Teal, et al.; U.S. Pat. No. 6,523,635 to Johnston, et al.; U.S. Pat. No. 6,524,205 to Irikura, et al.; U.S. Pat. No. 6,540,633 to Hasegawa, et al. and U.S. Patent RE 33,675 to Young.

Still others in the prior art have utilized a directional wheel assembly device for steering a vehicle. The directional wheel assembly devices of the prior art have been applied to large vehicles and have not been utilized in scooter type personal mobility vehicles. The following United States Patents are some of the prior art directional wheel assembly devices; U.S. Pat. No. 1,211,332 to Mehrings; U.S. Pat. No. 3,580,101 to Jorgensen; U.S. Pat. No. 3,799,569 to Baker; U.S. Pat. No. 4,172,503 to Ishioka, et al.; U.S. Pat. No. 4,570,739 to Kramer; U.S. Pat. No. 4,896,899 to Lawrence; U.S. Pat. No. 5,238,082 to Stegeman, et al.; U.S. Pat. No. 5,439,252 to Oxley, et al.; U.S. Pat. No. 5,481,937 to Uphaus, et al.; U.S. Pat. No. 5,613,404 to Lykken, et al.; U.S. Pat. No. 5,816,614 to Kramer, Jr., et al.; U.S. Pat. No. 5,890,397 to Stoner, et al.; U.S. Pat. No. 6,050,593 to McConnell, et al.; U.S. Pat. No. 6,332,621 to Wu; U.S. Pat. No. 6,474,689 to Mulhern, et al.; and U.S. Pat. No. 6,531,838 to Parks.

It is an object of the present invention to provide a scooter type personal mobility vehicle that overcomes the inadequacies of the scooters of the prior art and provides significant advancement in the scooter art.

Another object of this invention is to provide an improved personal mobility vehicle with a reduced turning radius having maneuverability commensurate with a power chair.

Another object of this invention is to provide an improved personal mobility vehicle with a reduced turning radius that is adaptable to either three wheel or four wheel personal mobility vehicles.

Another object of this invention is to provide an improved personal mobility vehicle with a reduced turning radius that does not substantially increase the weight of the personal mobility vehicle.

Another object of this invention is to provide an improved personal mobility vehicle with a reduced turning radius having an improved steering for controlling the directional wheel assembly.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention and the detailed description describing the preferred embodiment of the invention.

SUMMARY OF THE INVENTION

The present invention is defined by the appended claims with specific embodiments being shown in the attached drawings. For the purpose of summarizing the invention, the invention relates to a vehicle having a reduced turning radius comprising a directional wheel assembly for controlling the direction of the vehicle and drive wheel assembly for driving the vehicle. The drive wheel assembly comprises a first and a second drive wheel independently driven by a first and a second motor. A control circuit powers the first and second motors for rotating the first and second drive wheels to drive the vehicle. A counter-rotation circuit reverses power to one of the first and second motors for counter-rotating the first and second drive wheels upon a major turning position of the directional wheel assembly to enhance the turning of the vehicle.

In a more specific example of the invention, the vehicle comprises a first frame section and a second frame section. The directional wheel assembly comprises a directional wheel secured to the first frame section for turning the vehicle. The first and second drive wheels are secured to the second frame section. A slide mechanism interconnects the first frame section to the second frame section. The slide mechanism varies the distance between the directional wheel assembly and the drive wheel assembly. A reducing circuit is connected to the sensor and the control circuit for reducing power to the first and second motors to reduce the speed of the first and second drive wheels upon a minor turning of the directional wheel of the directional wheel assembly.

The counter-rotation circuit counter-rotates the first and second motors upon a major turning of the directional wheel of the directional wheel assembly to enhance the turning of the vehicle. An optional slide mechanism lock inhibits the slide mechanism from varying the distance between the directional wheel assembly and the directional wheel assembly when the control circuit is powering the drive wheel.

In another embodiment of the invention, the invention relates to an improved steering assembly for a vehicle comprising a directional wheel assembly secured to the vehicle for controlling the direction of the vehicle. A drive wheel assembly is secured to the vehicle for driving the vehicle. The directional wheel assembly comprises an axle mounting for rotatably mounting a directional wheel. A journal is secured to the vehicle for journaling the axle mounting relative thereto. A steering shaft extends between a first and a second end with a universal joint connecting the first end of the steering shaft to the axle mounting. A steering member is secured to the second end of the steering shaft for enabling an operator to turn the steering member about the steering shaft to journal the axle mounting for directing the vehicle with the directional wheel.

The foregoing has outlined rather broadly the more pertinent and important features of the present invention in order that the detailed description that follows may be better understood so that the present contribution to the art can be more fully appreciated. Additional features of the invention will be described hereinafter which form the subject matter of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
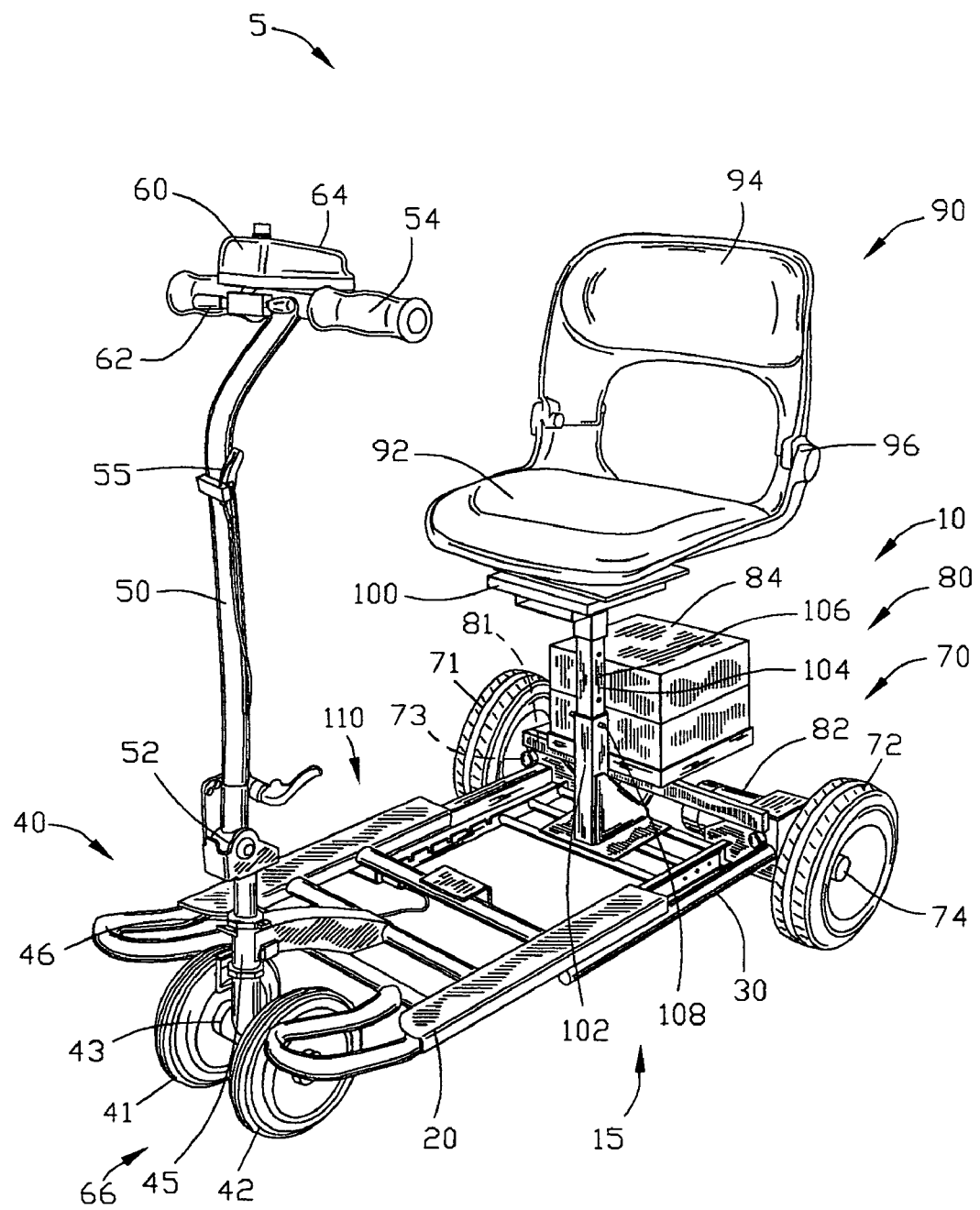
FIG. 1 is an isometric view of a vehicle incorporating a first embodiment of the present invention with a variable wheelbase shown in an extended position.
Figure 2:
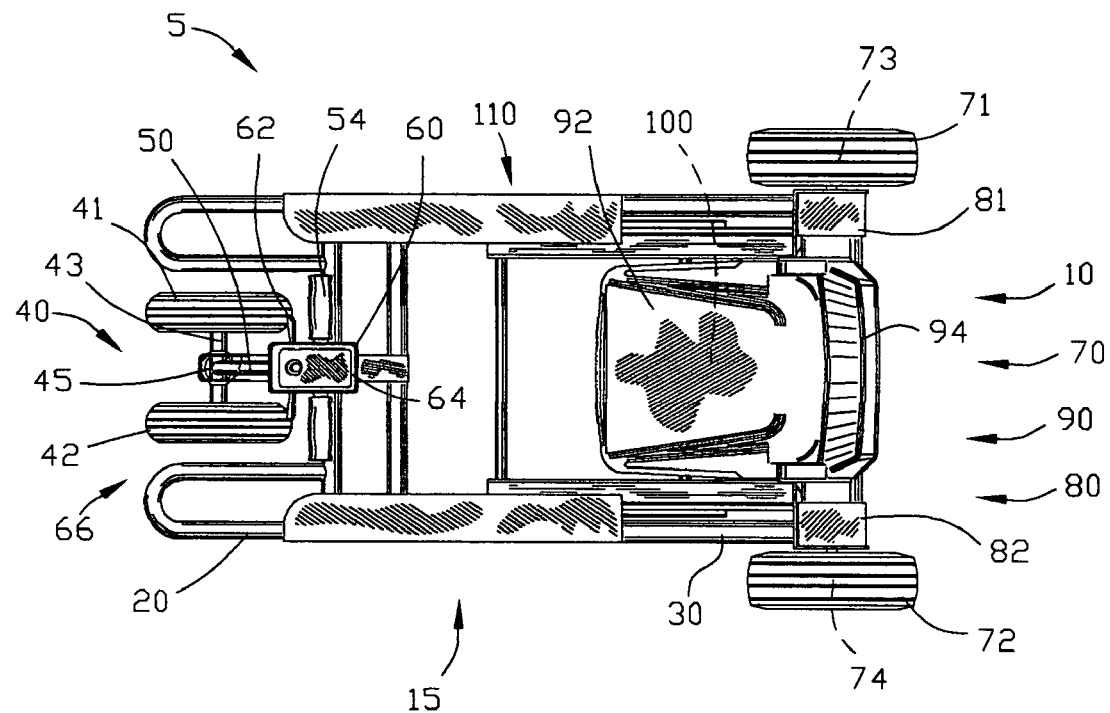
FIG. 2 is a top view of FIG. 1.
Figure 3:
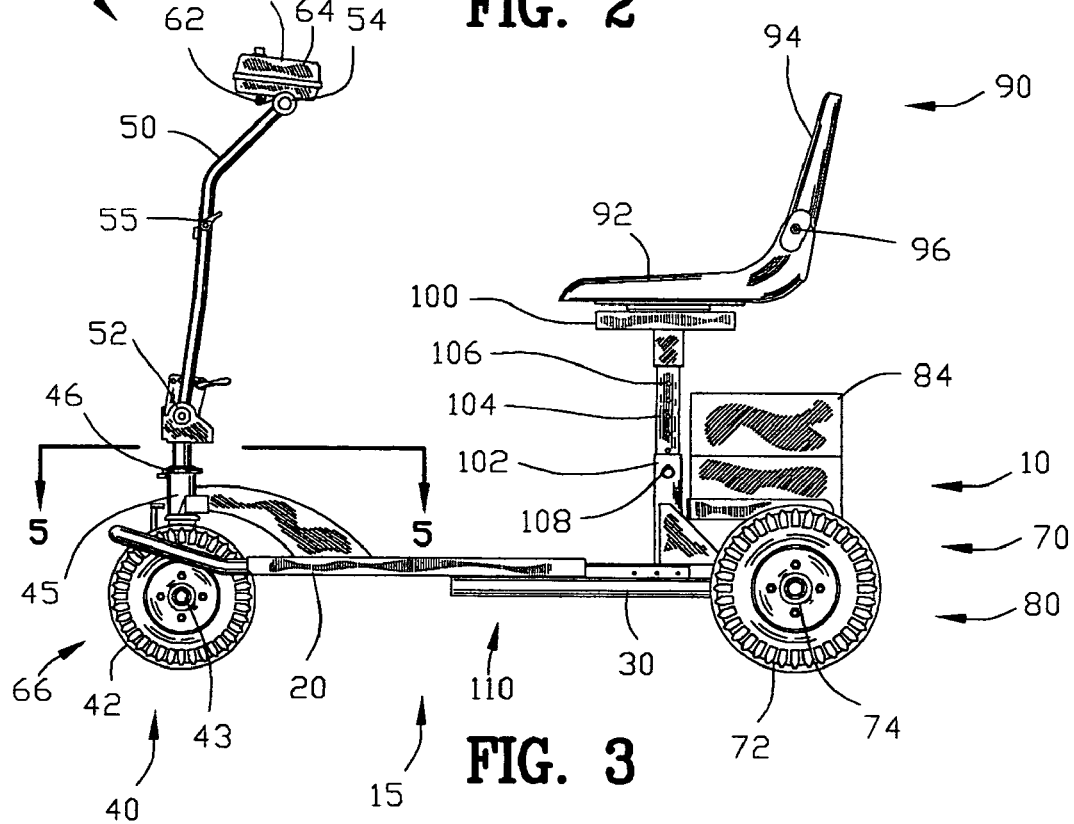
FIG. 3 is a side view of FIG. 1.

FIGS. 1-3 illustrate a vehicle 5 incorporating a counter-rotating drive unit 10 and a variable wheelbase mechanism 15 of the present invention. Although the vehicle 5 has been shown as a personal mobility vehicle 5, it should be understood and that the counter-rotating drive unit 10 and the variable wheelbase mechanism 15 of the present invention may be incorporated into virtually any type of land vehicle.

The personal mobility vehicle 5 comprises a first frame section 20 and the second frame section 30. The variable wheelbase mechanism 15 interconnects the first frame section 20 to the second frame section 30. The first frame section 20 comprises a directional wheel assembly 40 having a tiller 50 and a control 60. The second frame section 30 comprises a drive wheel assembly 70 powered by a drive unit 80 and a seat assembly 90.

The directional wheel assembly 40 comprises plural directional wheels 41 and 42 pivotably mounted relative to the first frame section 20 for controlling the direction of movement of the personal mobility vehicle 5. The plural directional wheels 41 and 42 are mounted on a common axle 43. The axle 43 is pivotably mounted relative by a pivot 45 within a pivot journal 46.

A tiller 50 is connected through a variable coupling 52 to the pivot 45. A handlebar 54 is connected to the tiller 50 for enabling an operator to pivot the plural directional wheels 41 and 42 about the pivot 45. The variable coupling 52 enables the tiller 50 and the handlebar 54 to be adjusted for the comfort of an operator as well as being collapsed for transportation and storage of the personal mobility vehicle 5. A movement of the handlebar 54 by the operator causes movement of the plural directional wheels 41 and 42 to alter the direction of the personal mobility vehicle 5.

A control circuit 60 is connected to a plurality of controls and switches conveniently located on the tiller 50 and/or the handlebar 54. The controls circuit 60 is connected to a speed control lever 62 for controlling the speed and the forward and reverse direction of the personal mobility vehicle 5. An optional disabling switch 64 may be installed on the tiller 50 and/or the handlebar 54. The function of the optional disabling switch 64 will be described in greater detail hereinafter.

The optional brake unit 66 is connected to the directional wheel assembly 40 to provide braking to directional wheels 41 and 42 of the vehicle 5. A hand lever (not shown) may be located on the tiller 50 to enable an operator to control the optional brake unit 66.

The drive wheel assembly 70 comprises a first and a second drive wheel 71 and 72 rotatably mounted on axles 73 and 74, respectively. A drive unit 80 is connected to the drive wheel assembly 70 to power the first and second drive wheels 71 and 72. In this example, the drive unit 80 comprises a first and a second drive motor 81 and 82 secured to the second frame section 30 for supporting the first and second drive wheels 71 and 72 through the axles 73 and 74. The first and second drive motors 81 and 82 may comprise conventional electric motors or may comprise electric motors commonly referred to as hub motors. The drive unit 80 includes a rechargeable battery 84 to provide power to the first and second drive motors 81 and 82 through the control circuit 60.

A seat assembly 90 is secured to the second frame section 30 of the personal mobility vehicle 5 by a seat connector 100. The seat assembly 90 comprises a seat base 92 and a backrest 94. The backrest 94 is pivotably mounted to the seat base 92 by a pivot 96 for folding the seat backrest 94. The backrest 94 of the seat assembly 90 may be adjustably and pivotably mounted to the seat base 92 for accommodating to the size and comfort of the operator.

The seat connector 100 comprises a socket 102 connected to the second frame section 30 of the personal mobility vehicle 5. A pedestal 104 is received within the socket 102 for supporting the seat base 92. A plurality of apertures 106 are located within the socket 102 and/or pedestal 104 are provided for adjusting the height of the seat base 92. A pin 108 extends through a plurality of selected apertures 106 to affix the height of the seat base for the comfort of the operator.

Figure 4:
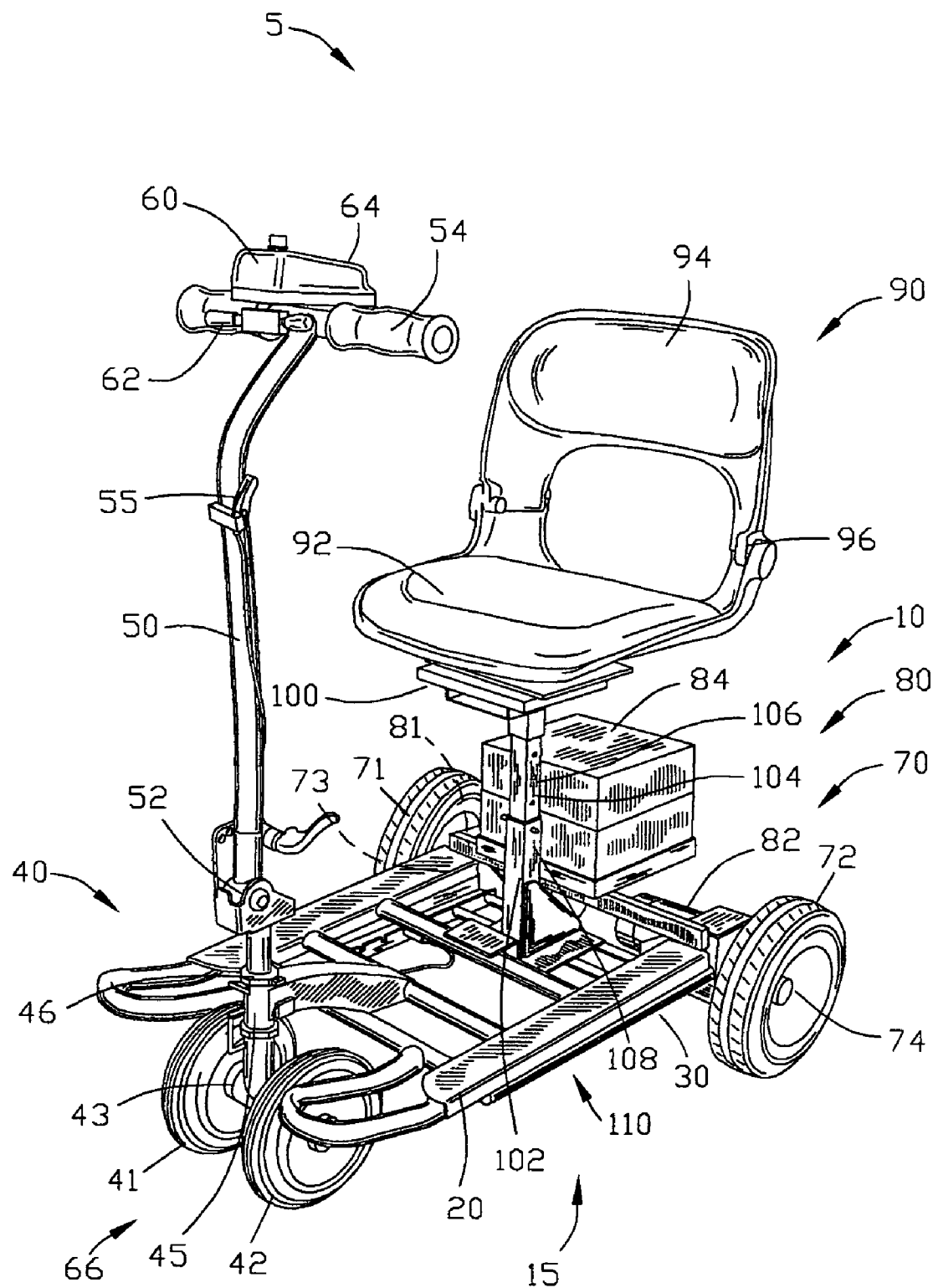
FIG. 4 is an isometric view of the vehicle of FIG. 1 with the variable wheelbase shown in a retracted position.
Figure 5:
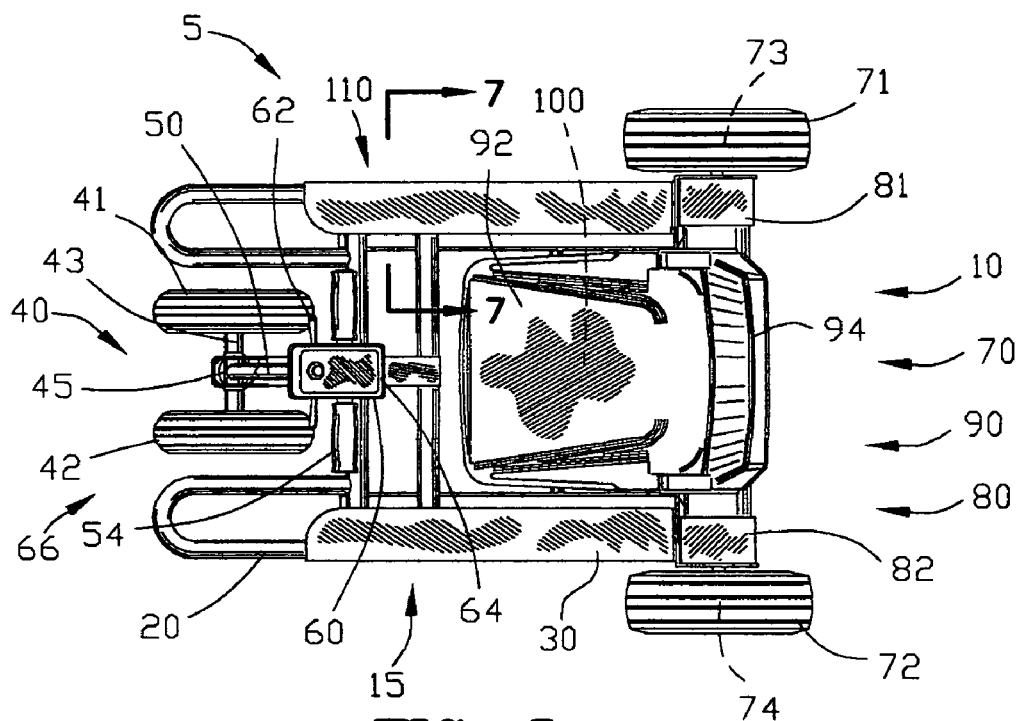
FIG. 5 is a top view of FIG. 4.
Figure 6:
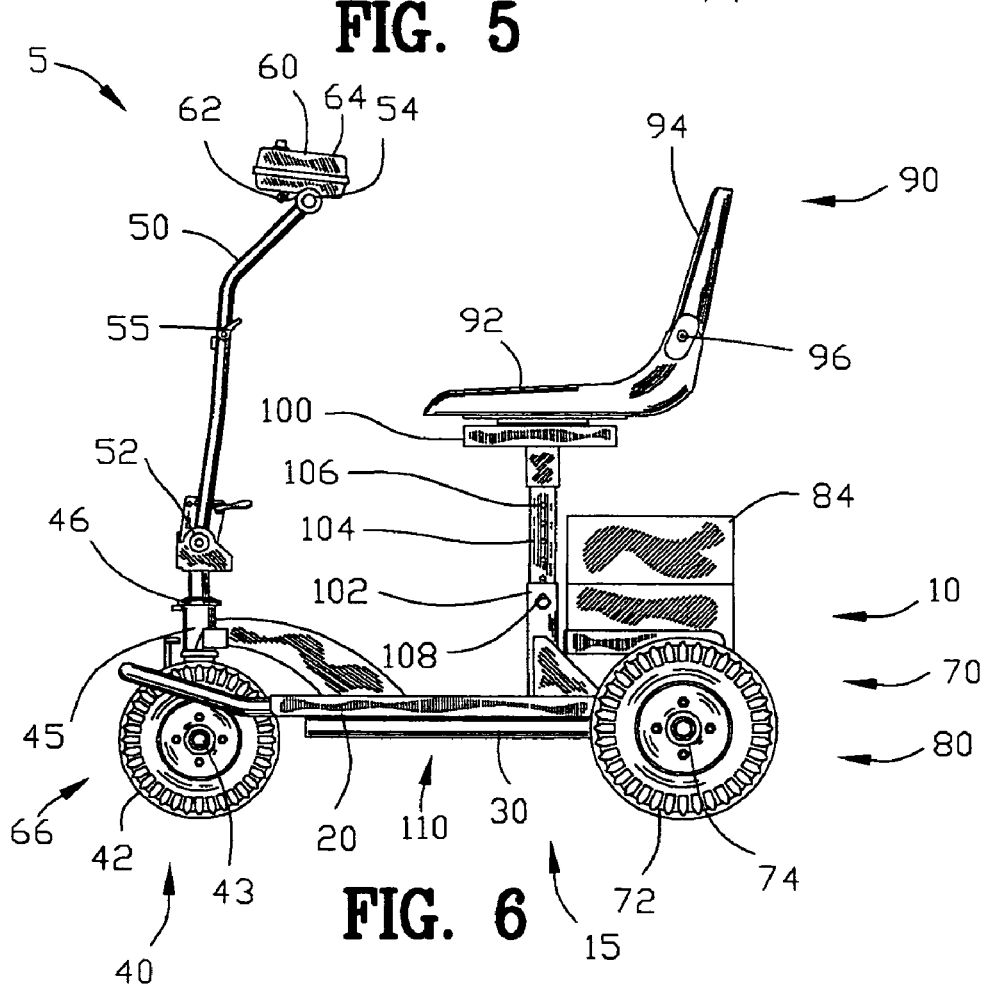
FIG. 6 is a side view of FIG. 4.

A seat base 92 is supported on the seat connector 100 for enabling an operator to be seated on the seat base 92 with the feet of the operator positioned on the first frame section 20. The seat base 92 is positioned with the weight of the operator located just forward of the first and second drive wheels 71 and 72. The variable wheelbase mechanism 15 enables the operator to vary the wheelbase between the directional wheels 41 and 42 and the first and second drive wheels 71 and 72 by the movement of the hands of the operator and/or by the movement of the feet of the operator. FIGS. 4-6 illustrate the vehicle 5 with the variable wheelbase mechanism 15 shown in a retracted position. The variable wheelbase mechanism 15 comprises a slide mechanism 110 interconnecting the first frame section 20 to the second frame section 30. The variable wheelbase mechanism 15 enables the directional wheel assembly 40 to move relative to the drive wheel assembly 70 for varying the wheelbase of the personal mobility vehicle 5.

FIGS. 7-11 are enlarged further views of the variable wheelbase mechanism 15. The slide mechanism 110 comprises a slider 111 mounted to a first frame portion 22 of the first frame section 20 and a slider receiver 112 mounted to a second frame portion 32 of the second frame section 30. A plurality of roller bearings 114 are located between the slider 111 and the slider receiver 112 for facilitating the movement of the first frame section 20 relative to the second frame section 30. In one example of the present invention, the slider 111, the slider receiver 112 and the plurality of roller bearings 114 functions in a manner similar to a heavy duty drawer slide.

Figure 7:
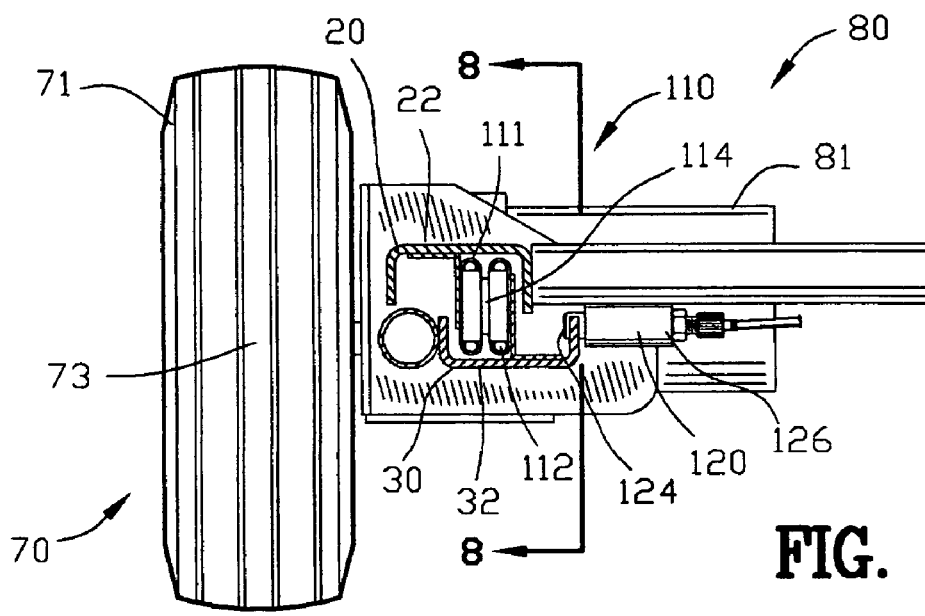
FIG. 7 is an enlarged sectional view along line 7-7 in FIG. 5 illustrating the locking of the variable wheelbase of the vehicle.
Figure 8:
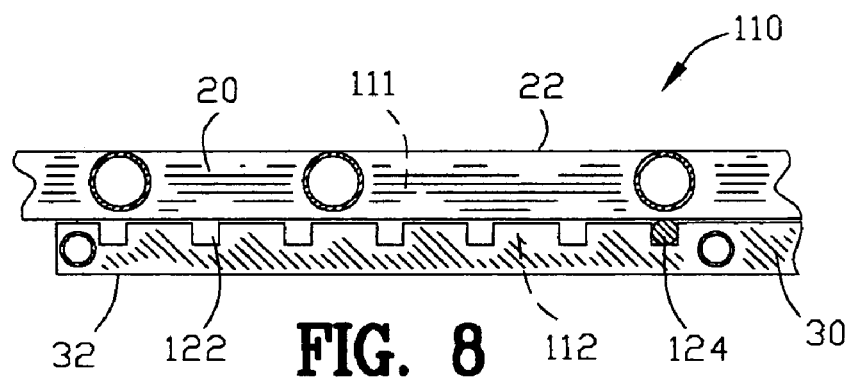
FIG. 8 is an enlarged sectional view along line 8-8 in FIG. 7.
Figure 9:
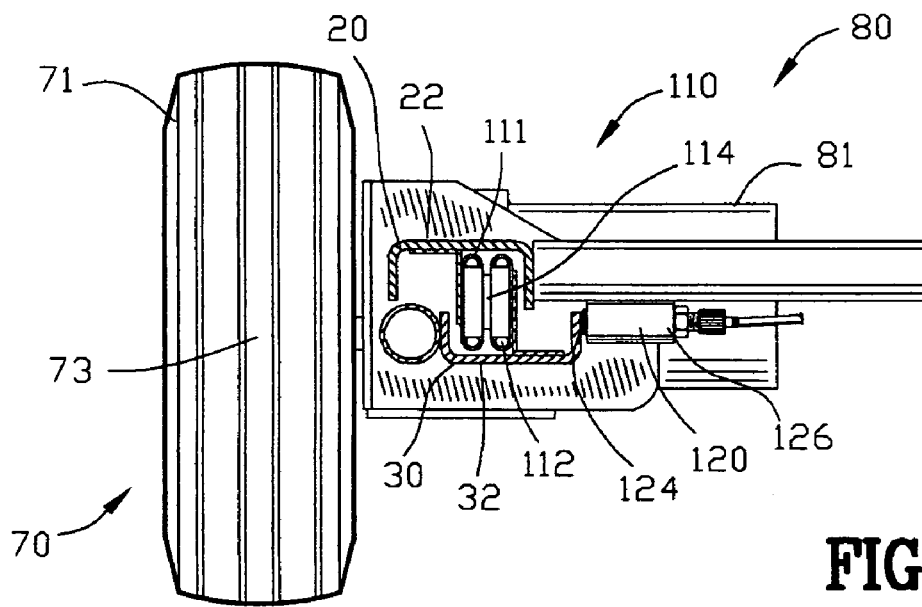
FIG. 9 is a view similar to FIG. 7 illustrating the unlocking of the variable wheelbase of the vehicle.

Preferably, the variable wheelbase mechanism 10 includes a lock 120. The lock 120 prevents relative movement between the directional wheel assembly 40 and the drive wheel assembly 70 when the lock is in a closed condition as shown in FIG. 7. The lock 120 enables relative movement between the directional wheel assembly 40 and the drive wheel assembly 70 when the lock is in an open condition as shown in FIG. 9.

The lock 120 comprises a plurality of apertures 122 defined in the second frame portion 32 of the second frame section 30. A locking pin 124 is secure relative to the first frame portion 22 of the first frame section 20. In this example, the locking pin 124 is shown extending from a spring loaded manually actuated housing 126. A lever 55 located on the tiller 50 manually actuates the locking pin 124.

In the alternative, the locking pin 124 may by connected to an electrically operated solenoid (not shown) for engaging with a selected one of the plurality of apertures 122. The electrically operated solenoid (not shown) may be connected to the control circuit 60 for maintaining the lock between the slider 111, the slider receiver 112 during movement of the vehicle 5.

FIG. 7 illustrates the lock 120 securing the slider 111 relative to the slider receiver 112 of the variable wheelbase mechanism 10. The locking pin 124 is shown engaged with one of the plurality of apertures 122 to securing the slider 111 relative to the slider receiver 112.

FIG. 9 illustrates the lock 120 releasing the slider 111 relative to the slider receiver 112 of the variable wheelbase mechanism 10. The locking pin 124 is shown removed from the plurality of apertures 122 to securing the slider 111 relative to the slider receiver 112.

Figure 10:
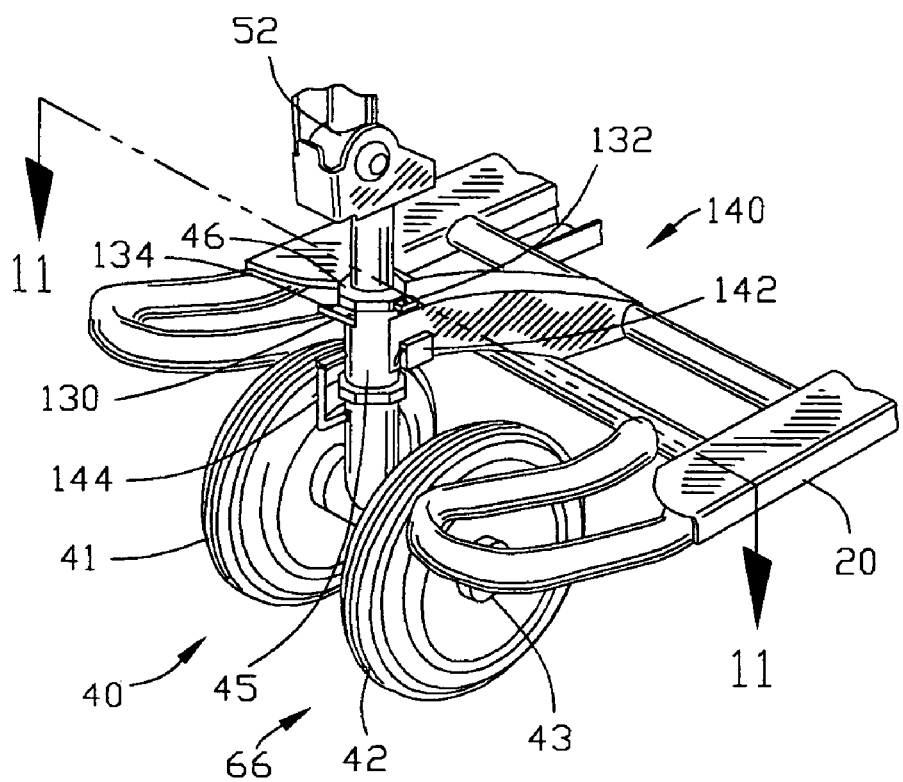
FIG. 10 is an enlarged view of a portion of FIG. 4.
Figure 11:
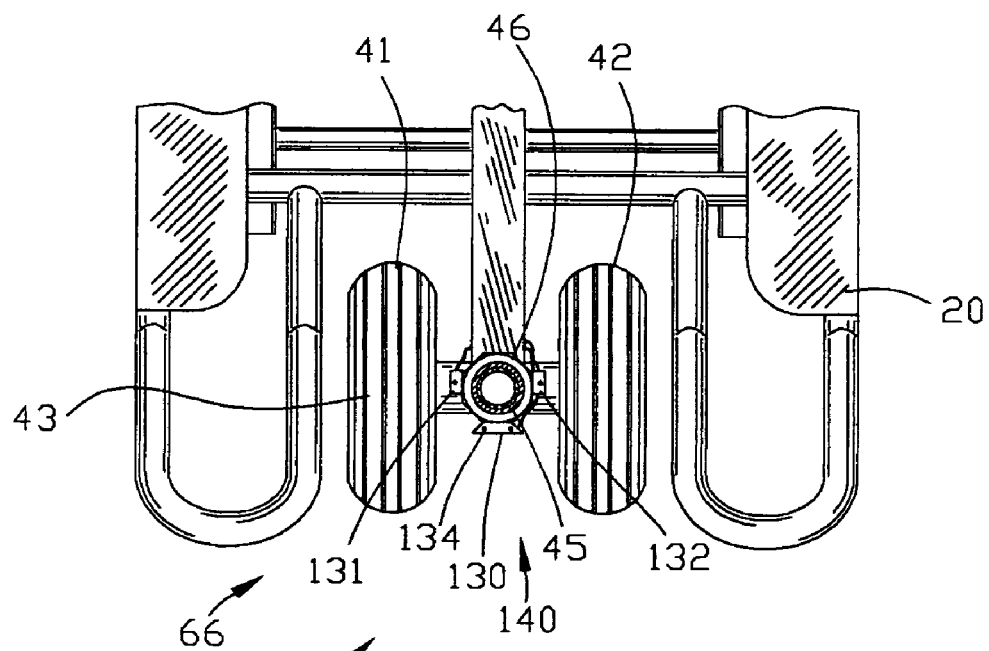
FIG. 11 is an enlarged sectional view along line 11-11 in FIG. 10.

FIGS. 10 and 11 are enlarged views of a portion of the directional wheel assembly 40 of the vehicle 5 shown in FIGS. 1-9. The control circuit 60 includes a left and a right minor position sensor 130 and a left and a right major position sensor 140. In this example, the left and right minor position sensors 130 comprise a left and a right magnetic switch 131 and 132 and a magnet 134. The left and right magnetic switches 131 and 132 are secured to the pivot journal 46 whereas the magnet 134 is secured to the pivot 45. The magnet 134 actuates the left and right minor switches 131 and 132 upon a minor left turn and a minor right turn of the directional wheels 41 and 42 of the directional wheel assembly 40.

The left and right major position sensors 140 are shown as a first and a second micro switches 141 and 142 secured to the pivot journal 46. An actuator 144 is secured to the pivot 45 for actuating the first and second micro-switches 141 and 142 upon a major right and a major left turn of the directional wheels 41 and 42 of the directional wheel assembly 40.

Figure 12:
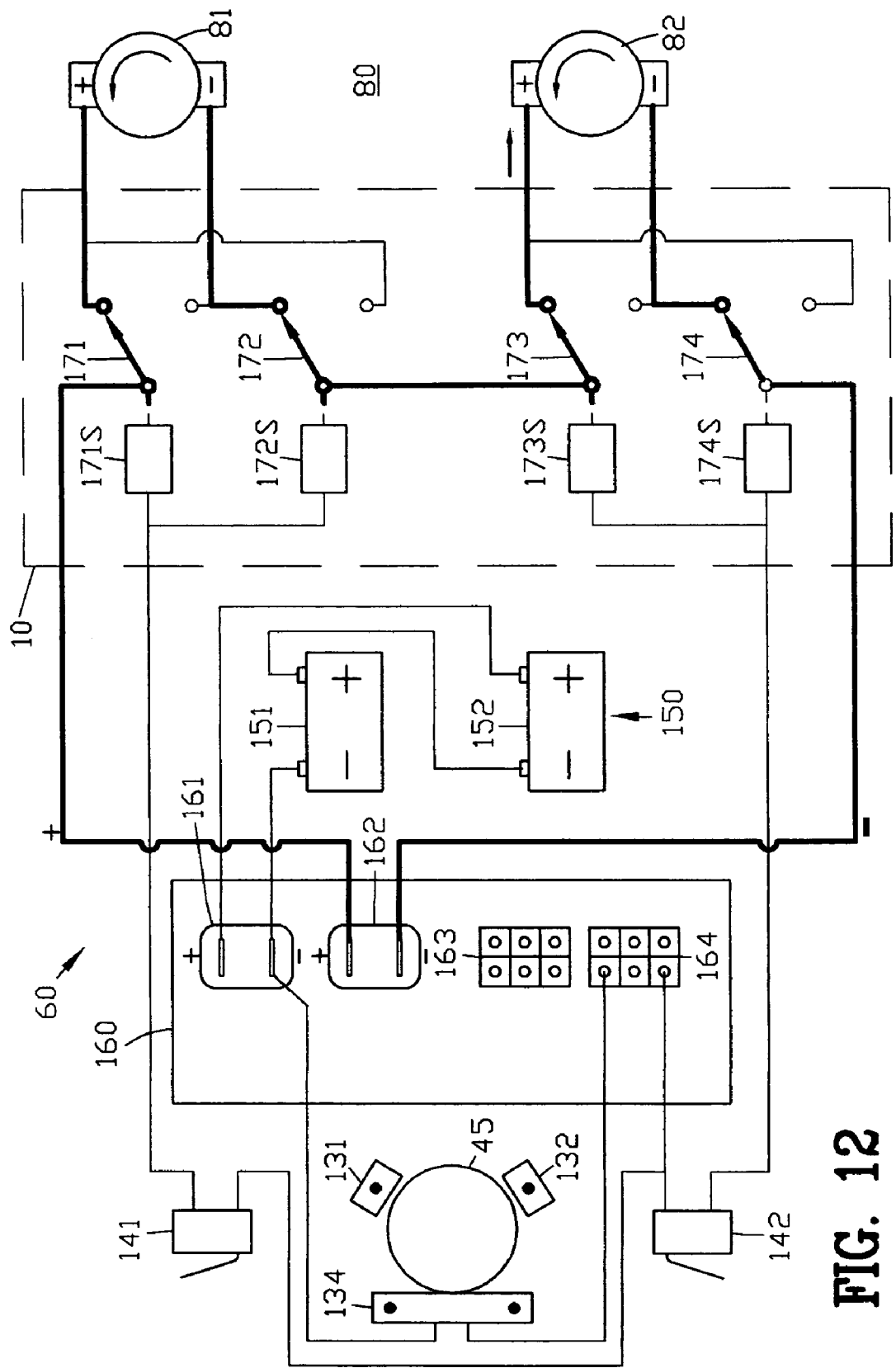
FIG. 12 is an electrical diagram of a control circuit and a counter-rotation circuit for use with the vehicle of the present invention.

FIG. 12 is a schematic diagram the control circuit 60 and the counter-rotation circuit 10 of the present invention. The control circuit 60 is powered by a power source 150 shown as a first and a second battery 151 and 152. The control circuit 60 comprises a conventional scooter control 160 suitable for use with a single motor drive. The scooter control 160 includes a first through fourth socket 161-164 for connection to external components.

Figure 13:
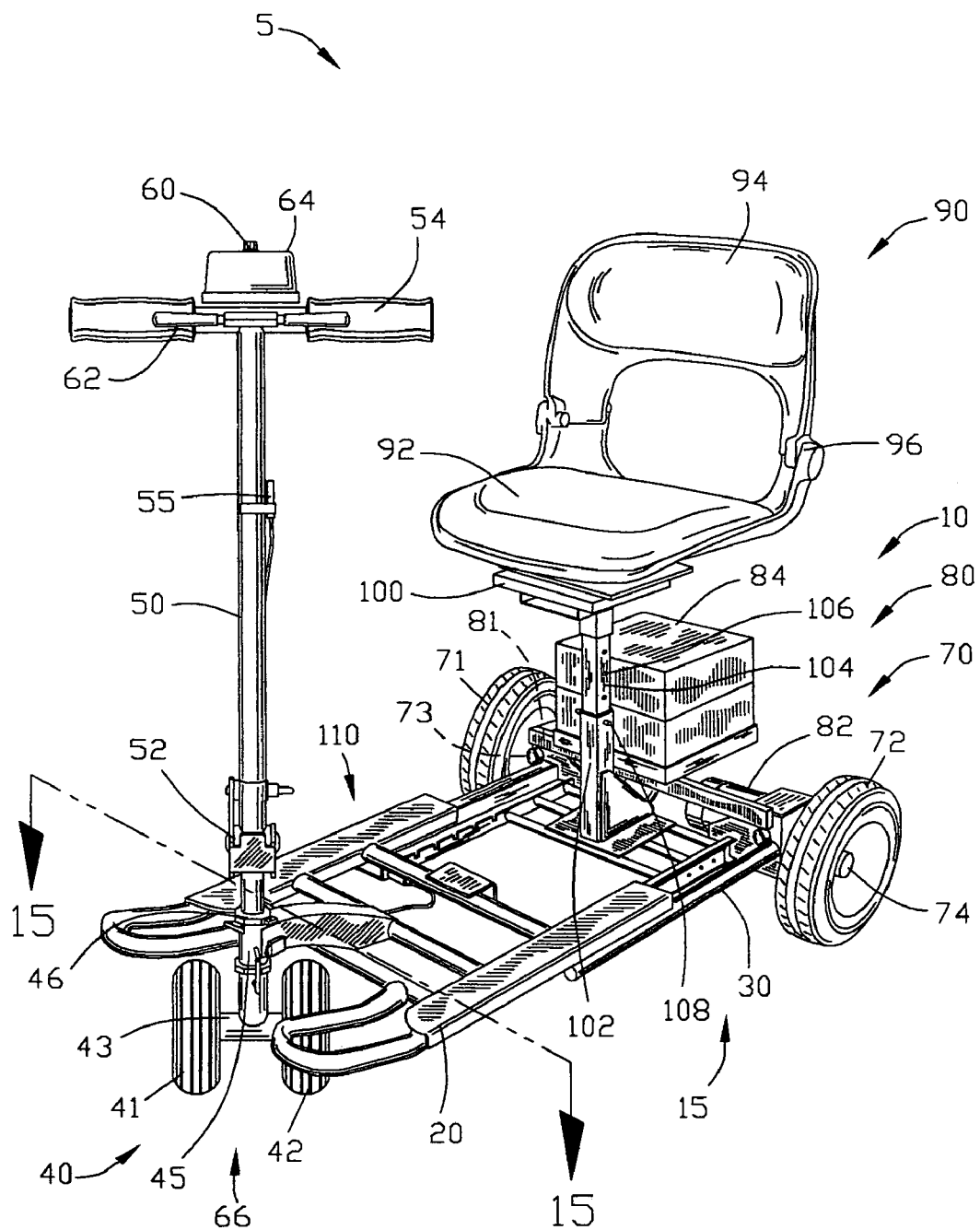
FIG. 13 is an isometric view similar to FIG. 1 with the directional wheel assembly s pivoted into minor left pivoted position.
Figure 14:
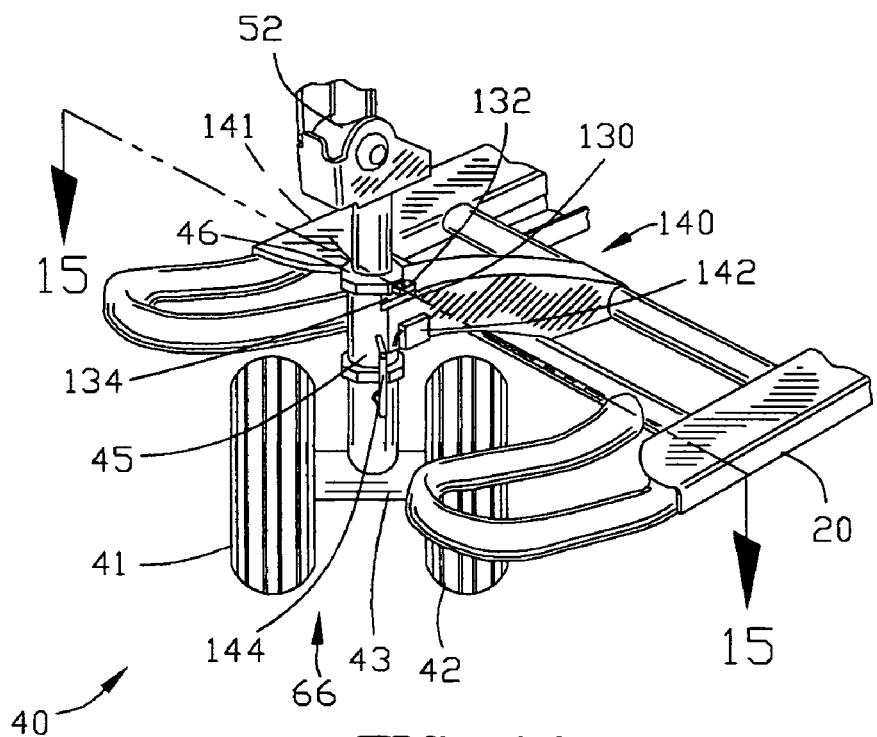
FIG. 14 is an enlarged view of a portion of FIG. 13.
Figure 15:
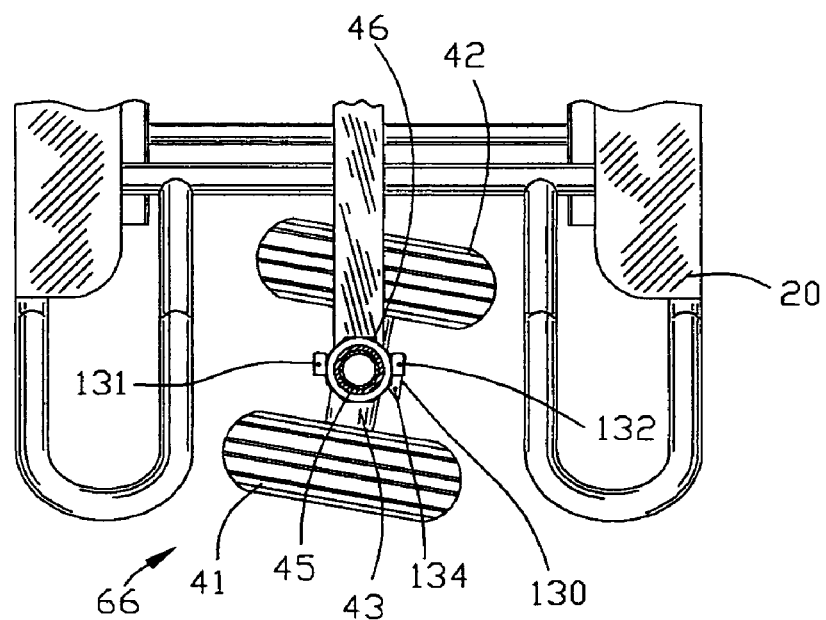
FIG. 15 is an enlarged sectional view along line 15-15 in FIG. 14.

The counter-rotation circuit 10 is interposed between the control circuit 60 and the drive unit 80. The counter-rotation circuit 10 comprises first through fourth switches 171-174 for connecting the control circuit 60 to the first and second drive motors 81 and 82. Solenoid operators 171S-174S operate the first through fourth switches 171-174, respectively. In the alternative, the first through fourth switches 171-174 may be solidstate switches 171-174 of suitable design. FIGS. 13-15 illustrate the vehicle 5 with the directional wheels 41 and 42 located in a minor left turn position. When the directional wheels 41 and 42 are located in the minor left turning position, the control circuit 60 is changed into a low speed operation. In a similar manner, the control circuit 60 is changed into a low speed operation when the directional wheels 41 and 42 are located in the minor right turn position.

Figure 16:
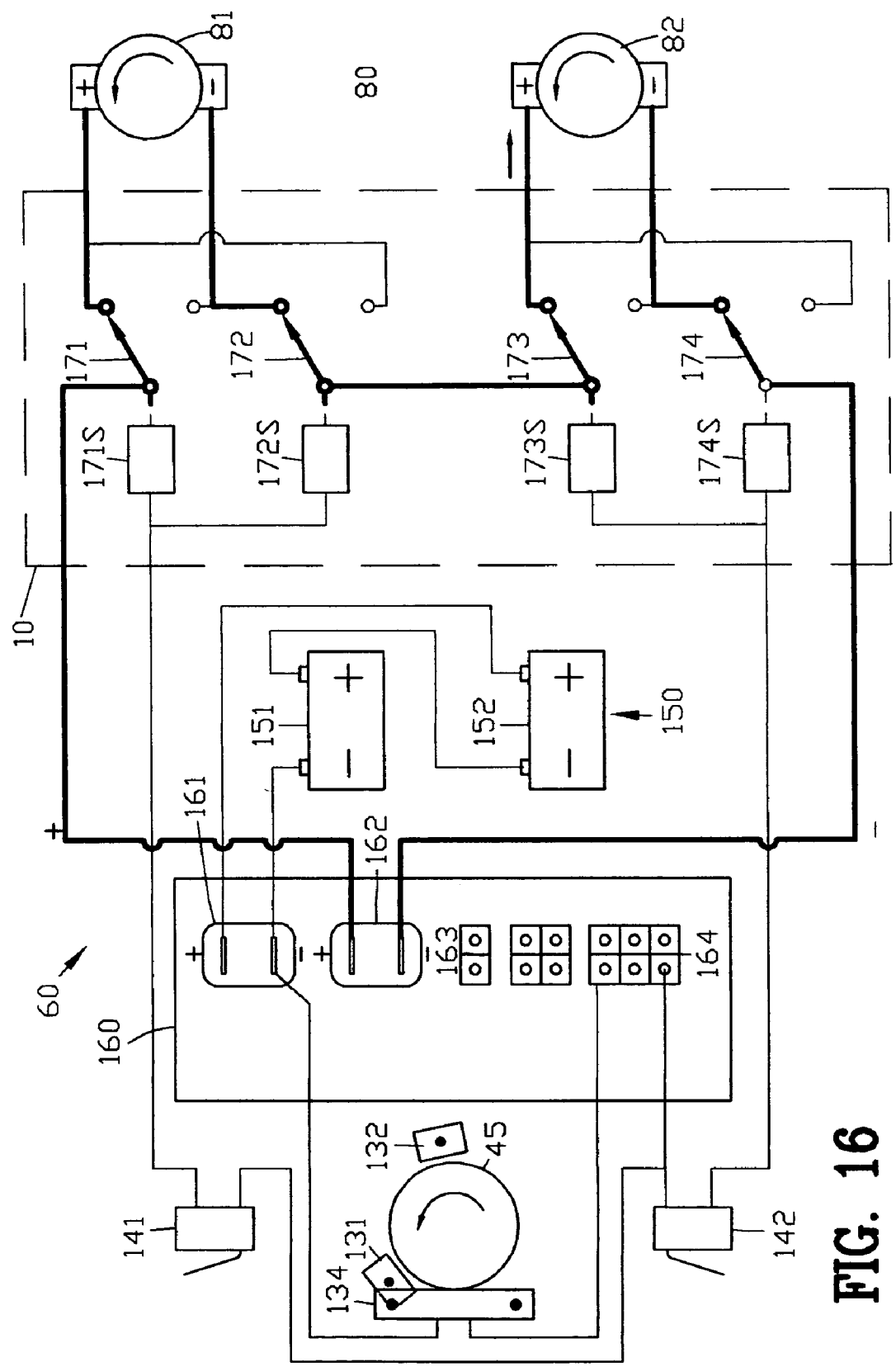
FIG. 16 illustrates the electrical diagram of FIG. 12 when a directional wheel assembly is pivoted into a minor left pivoted position.

FIG. 16 illustrates the control circuit 60 with the directional wheels 41 and 42 pivoted into the minor left turn position. The first magnetic switch 131 is positioned adjacent to the magnet 134 to close the first magnetic switch 131. The first magnetic switch 131 changes the conventional control 160 into a low speed operation. When the directional wheels 41 and 42 of the vehicle 5 are pivoted to undertake either a left or a right minor turn, the conventional control circuit 160 is changed into a low speed operation. This low speed operation contributes to the stability of the vehicle 5 during the turning of the vehicle 5.

The position of the first and second magnetic switches 131 and 132 and/or the magnet 134 establishes the angular position of the left and right minor turns of the directional wheels 41 and 42. In one example, the left and right minor turns of the directional wheels 41 and 42 is selected to be between 50 to 80 degrees.

Figure 17:
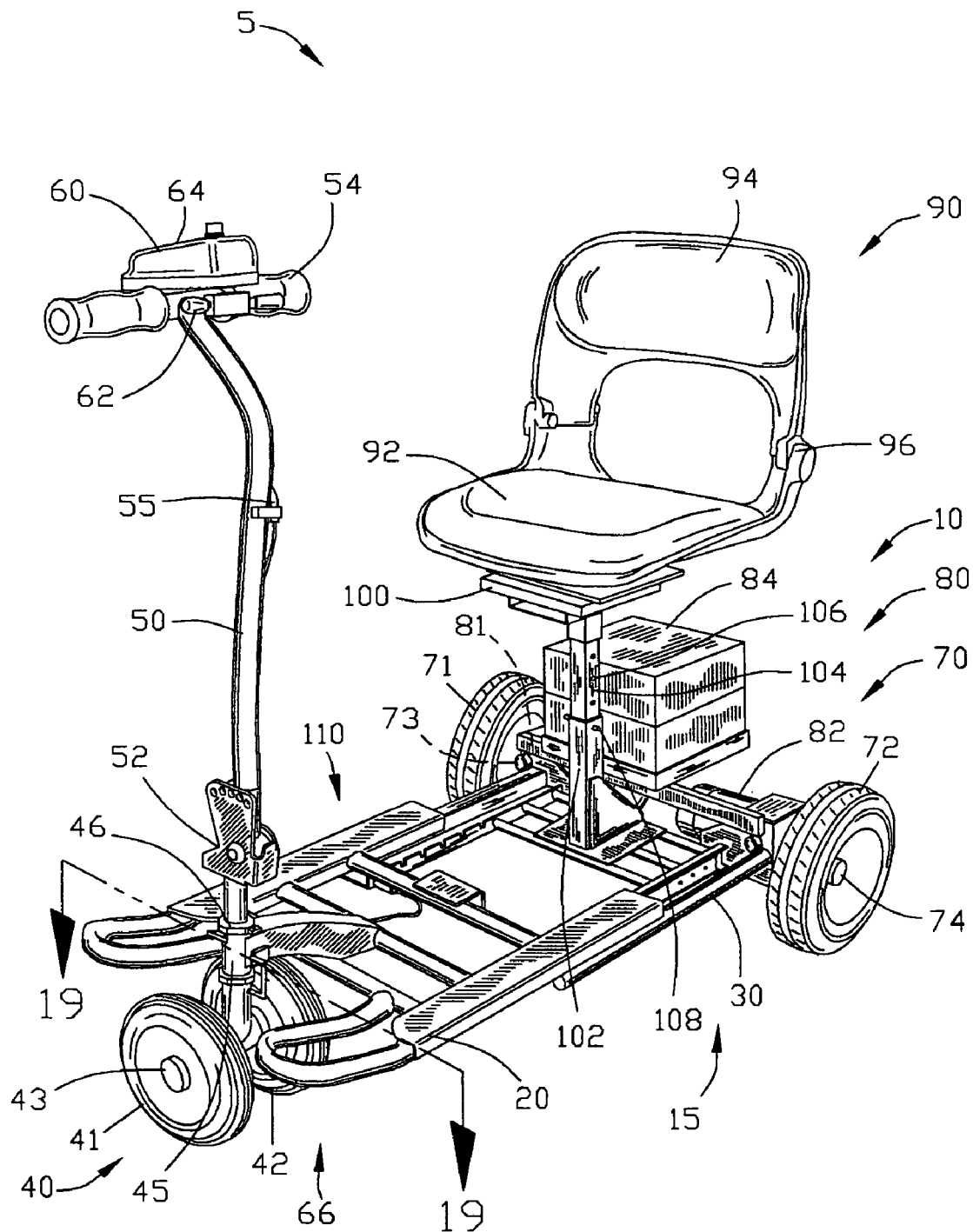
FIG. 17 is an isometric view similar to FIG. 1 with the directional wheel assembly pivoted into major left pivoted position.
Figure 18:
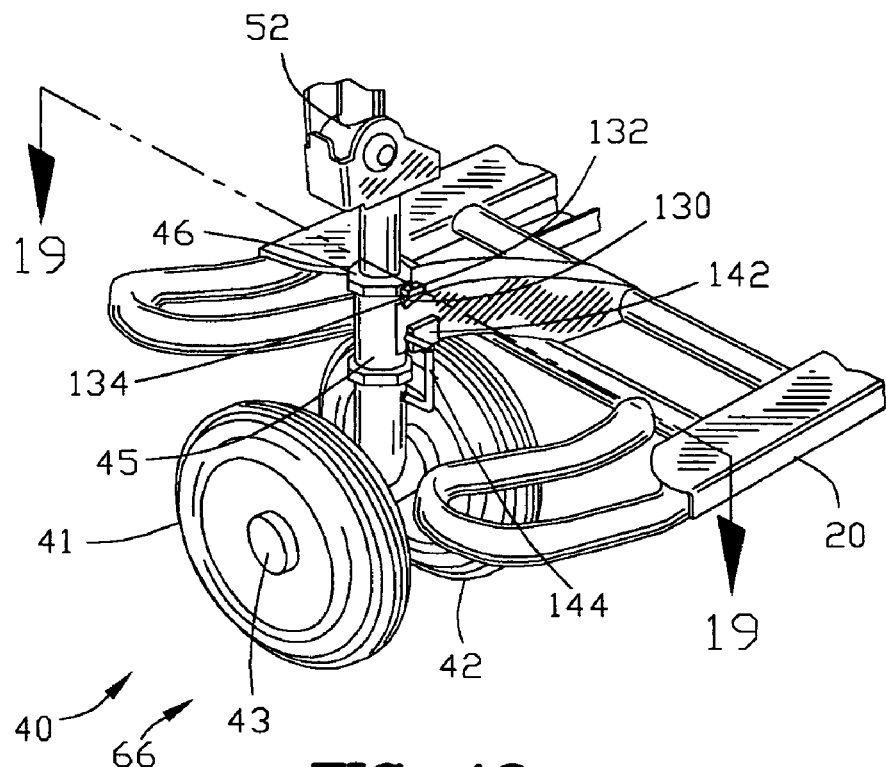
FIG. 18 is an enlarged view of a portion of FIG. 17.
Figure 19:
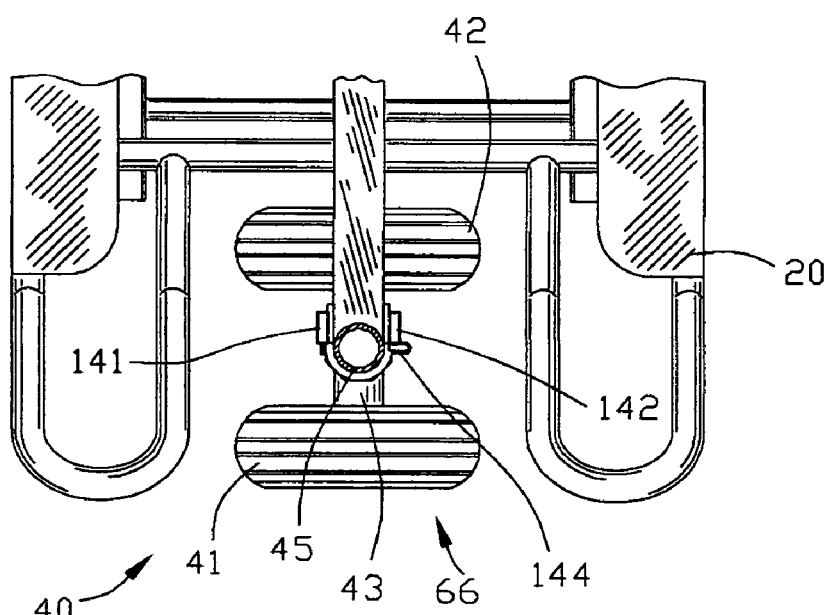
FIG. 19 is an enlarged sectional view along line 19-19 in FIG. 18.

FIGS. 17-19 illustrate the vehicle 5 with the directional wheels 41 and 42 located in a major left turn position. When the directional wheels 41 and 42 are located in the major left turning position, the counter-rotation circuit 10 is actuated for facilitating the turning of the vehicle 5. In a similar manner, the counter-rotation circuit 10 is actuated for facilitating the turning of the vehicle 5 when the directional wheels 41 and 42 are located in the major right turning position.

Figure 20:
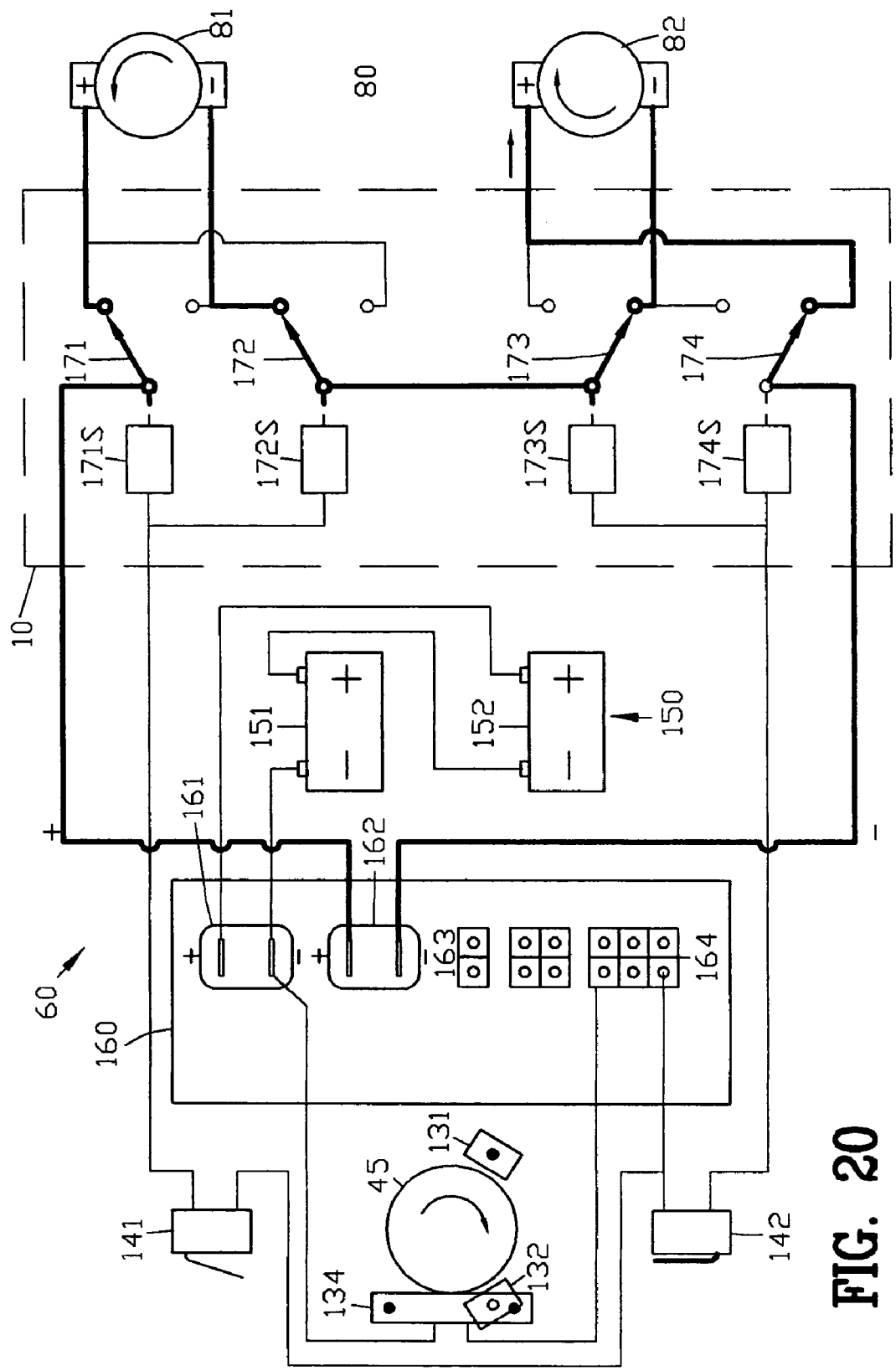
FIG. 20 illustrates the electrical diagram of FIG. 12 when the directional wheel assembly is pivoted into a major left pivoted position.

FIG. 20 illustrates the control circuit 60 when the directional wheels 41 and 42 are positioned in a major left turn position as shown in FIGS. 17-19. As the directional wheels 41 and 42 pass through the minor left turn position, the magnet 134 actuates the first magnetic switch 131 to change the conventional control 160 into a low speed operation. As the directional wheels 41 and 42 reach the major left turn position, the second microswitch 142 is actuated by the actuator 144 to change switches 173 and 174 of the counter-rotation circuit 10. In this example, the switches 173 and 174 are energized by solenoids 173S and 174S to position the switches 173 and 174 as shown in FIG. 20.

Electrons from the socket 162 of the conventional control 160 flows from the negative lead of the conventional power source 160 through the switch 174, motor 82, switch 173, switch 172, motor 81 and switch 171 to return to the positive lead of the conventional power source 160 as shown in bold. The first motor 81 moves the first wheel 71 in a forward direction whereas the second motor 82 moves the second wheel 72 in a reverse direction. The forward movement of the first wheel 71 in combination with a reverse movement of the second wheel 72 results in the vehicle 5 turning about point between the first and second wheels 71 and 72.

Figure 21:
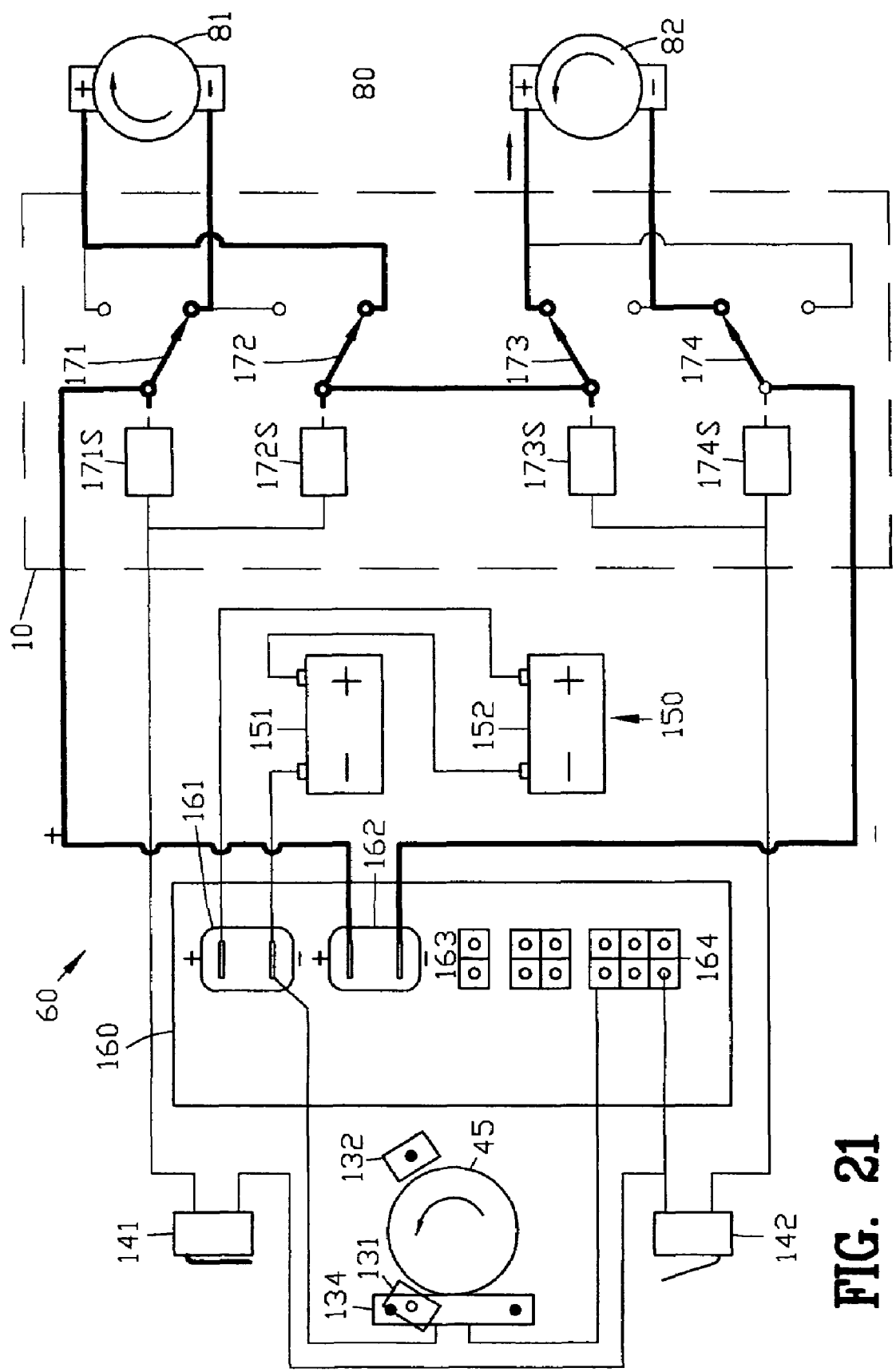
FIG. 21 illustrates the electrical diagram of FIG. 12 when the directional wheel assembly is pivoted into a major right pivoted position.

FIG. 21 illustrates the control circuit 60 when the directional wheels 41 and 42 are positioned in a major right turn position (not shown). As the directional wheels 41 and 42 pass through the minor right turn position, the magnet 134 actuates the second magnetic switch 132 to change the conventional control 160 into a low speed operation. As the directional wheels 41 and 42 reach the major right turn position, the first microswitch 141 is actuated by the actuator 144 to change switches 171 and 172 of the counter-rotation circuit 10 into position shown in FIG. 21.

Electrons from the socket 162 of the conventional control 160 flows from the negative lead of the conventional power source 160 through the switch 174, motor 82, switch 173, switch 172, motor 81 and switch 171 to return to the positive lead of the conventional power source 160 as shown in bold. The first motor 81 moves the first wheel 71 in a reverse direction whereas the second motor 82 moves the second wheel 72 in a forward direction. The reverse movement of the first wheel 71 in combination with a forward movement of the second wheel 72 results in the vehicle 5 turning about point between the first and second wheels 71 and 72.

Figure 22A:
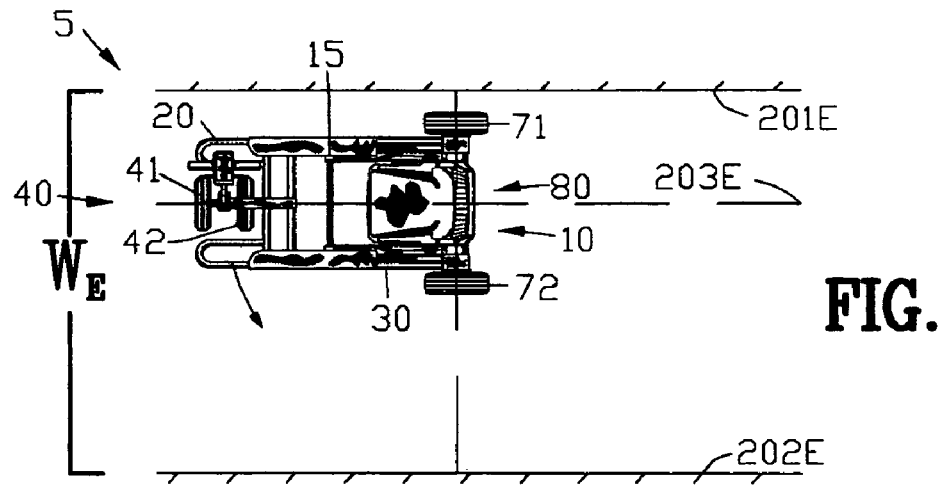
FIG. 22A is a top view of the vehicle of FIGS. 1-21 moving in a direction parallel to opposed barriers.
Figure 22B:
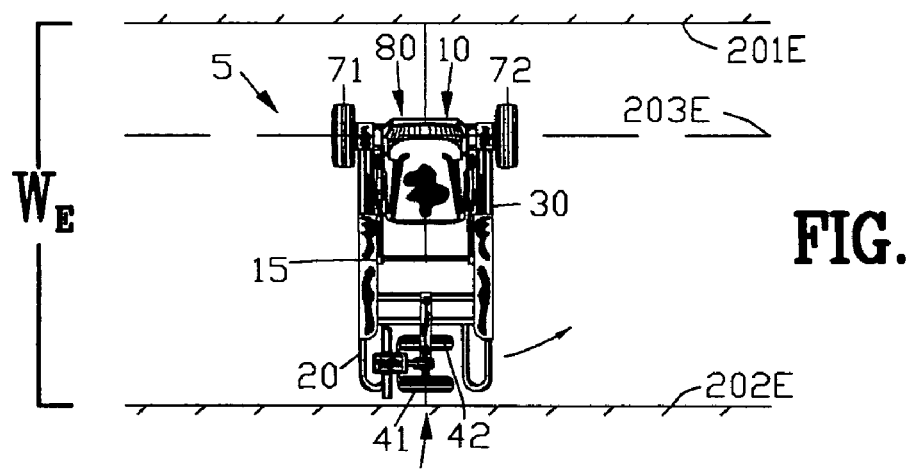
FIG. 22B is a top view similar to FIG. 22A illustrating the vehicle turning between the opposed barriers.
Figure 22C:
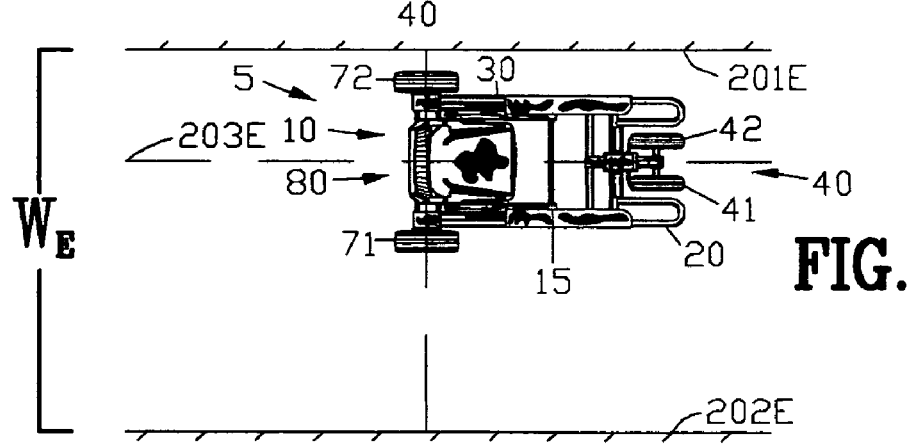
FIG. 22C is a top view similar to FIG. 22A illustrating the vehicle moving in an opposite direction parallel to the opposed barriers.

FIGS. 22A-22C are plan views of the vehicle 5 located between a first and a second barrier 201E and 202E and over a centerline 203E. The first and second barriers 201E and 202E may represent walls, tables, furniture, or any similar other obstacle for the vehicle 5.

FIG. 22A illustrates the vehicle 5 moving along the centerline 203E in a first direction. The vehicle 5 moves in a parallel relationship with the first barrier 201E and in close proximity thereto.

FIG. 22B illustrates the vehicle 5 undertaking a turn between the first and second barriers 201E and 202E. The directional wheels 41 and 42 on the vehicle 5 are positioned in a major left turn position to undertake a 180 degree turn. The first motor 81 moves the first wheel 71 in a forward direction whereas the second motor 82 moves the second wheel 72 in a reverse direction. The vehicle 5 turns about a turning point equidistant between the first and second drive wheels 71 and 72 and superimposed over the centerline 203E.

FIG. 22C illustrates the completion of the turn of 180 degrees by the vehicle 5. The vehicle 5 moves along the centerline 203E in a second and reverse direction. The vehicle 5 moves in a parallel relationship with the first barrier 201E and in close proximity thereto. The vehicle 5 was able to negotiate the 180 degree turn into width WE between the first and second barriers 201E and 202E.

Figure 23A:
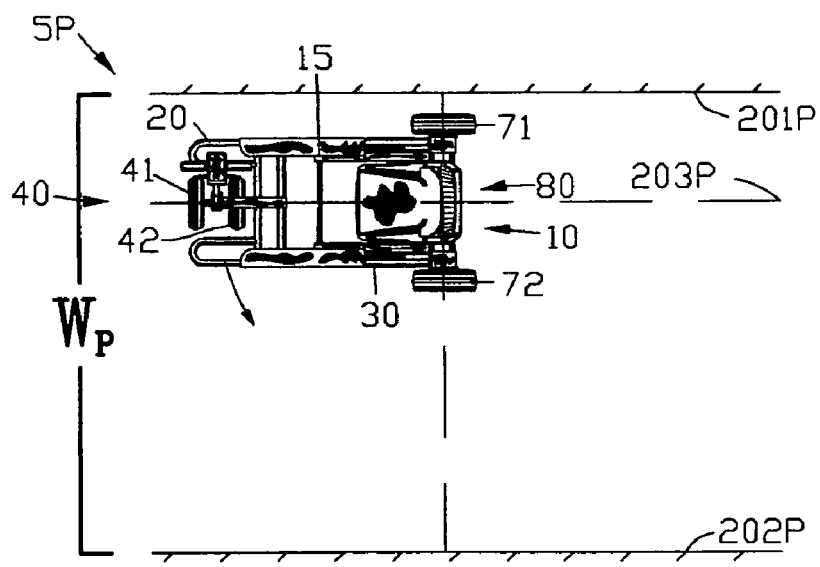
FIG. 23A is a top view of a vehicle of the prior art moving in a direction parallel to opposed enlarged barriers.
Figure 23B:
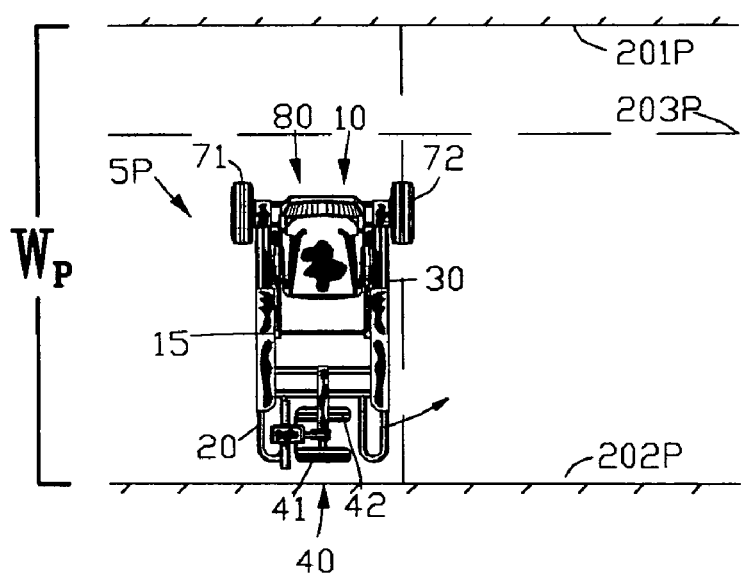
FIG. 23B is a top view similar to FIG. 23A illustrating the vehicle of the prior art turning between the opposed enlarged barriers.
Figure 23C:
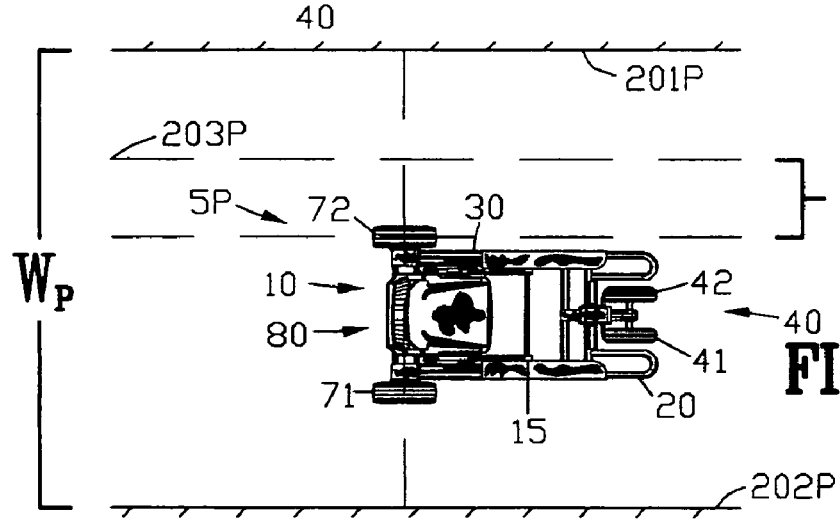
FIG. 23C is a top view similar to FIG. 23A illustrating the vehicle of the prior art moving in an opposite direction parallel to the opposed enlarged barriers.

FIGS. 23A-23C are plan views of a conventional vehicle 5P of the prior art located between a first and a second barrier 201P and 202P and over a centerline 203P. The conventional vehicle 5P of the prior art lacks the counter-rotation circuit 10 of the present invention. The first and second barriers 201P and 202P are spaced by a width WP.

FIG. 23A illustrates the vehicle 5P moving along the centerline 203P in a first direction. The vehicle 5P moves in a parallel relationship with the first barrier 201P and in close proximity thereto.

FIG. 23B illustrates the vehicle 5P undertaking a turn between the first and second barriers 201P and 202P. The directional wheels 41 and 42 on the vehicle 5 are positioned in a major left turn position to undertake a 180 degree turn. With a conventional drive system of the prior art, the vehicle 5P turns about the second wheel 72.

FIG. 23C illustrates the completion of the turn of 180 degrees by the vehicle 5. The vehicle 5 is displaced from the centerline 203P in a second and reverse direction. The vehicle 5 moves in a parallel relationship with the first and second barriers 201P and 202P. The vehicle 5 was able to negotiate the 180 degree turn into width WP between the first and second barriers 201P and 202P. The width WP between the first and second barriers 201P and 202P of FIGS. 23A-23C is significantly wider than the width WE of FIGS. 22A-22C.

Figure 24:
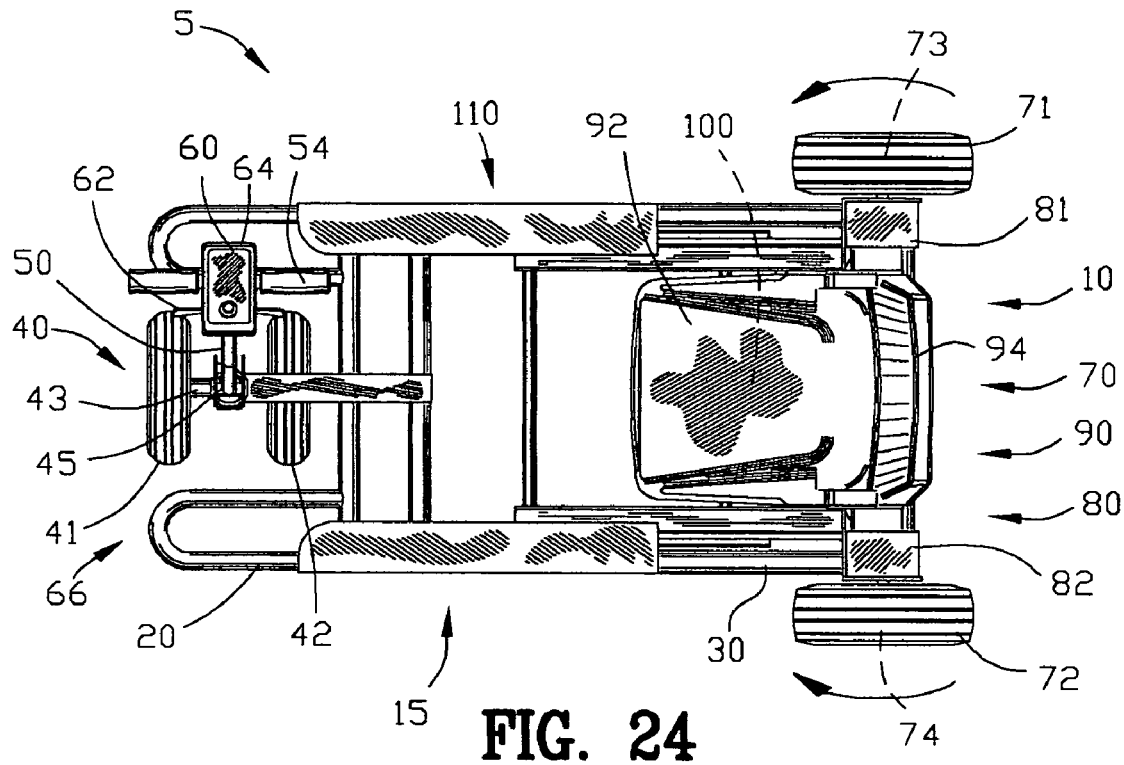
FIG. 24 is a top view similar to FIG. 2 with the directional wheel assembly pivoted into major left pivoted position simultaneously with the rotation of drive wheels for changing the variable wheelbase from the extended position to the retracted position.

FIG. 24 is a top view similar to FIG. 2 illustrating the vehicle 5 with the variable wheelbase mechanism 15 in the expanded position. The directional wheels 41 and 42 on the vehicle 5 are positioned in a major left turn position. In this example, the control circuit 60 includes an optional switch 180 for enabling the vehicle 5 to be retracted through the power of the drive assembly 80.

Figure 25:
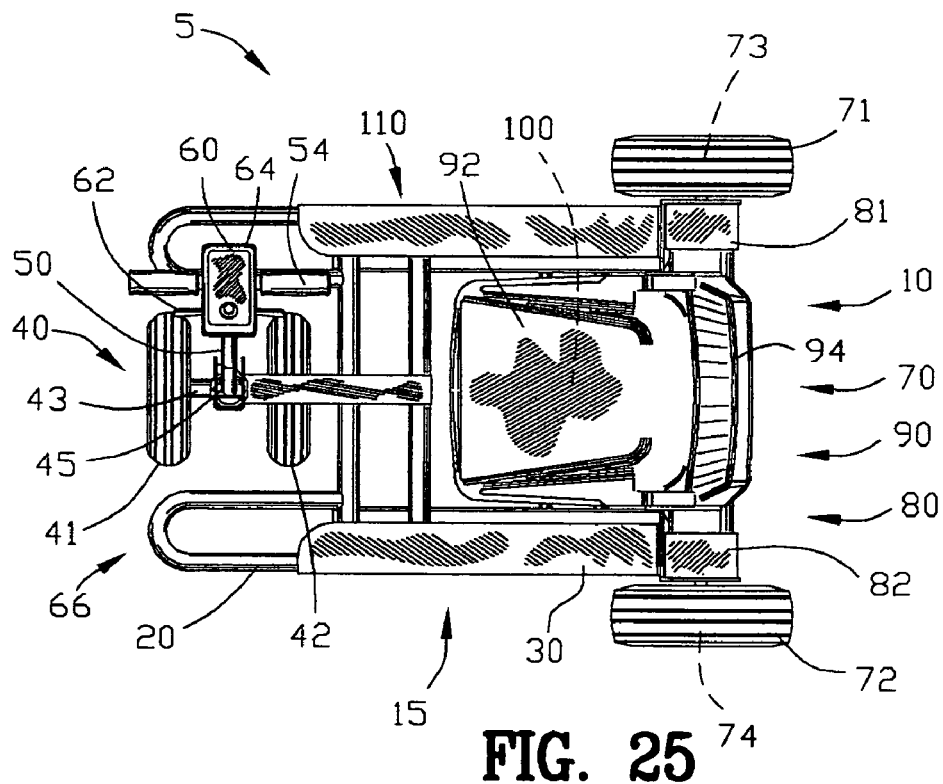
FIG. 25 is a top view similar to FIG. 24 with the variable wheelbase disposed in the retracted position.

FIG. 25 is a top view similar to FIG. 5 illustrating the vehicle 5 with the variable wheelbase mechanism 15 in the retracted position. The vehicle 5 is shown with the variable wheelbase mechanism 15 in the retracted position through the power of the drive assembly 80. The variable wheelbase mechanism 15 reduces the distance between the directional wheels 41 and 42 and the drive wheels 71 and 72.

Figure 26:
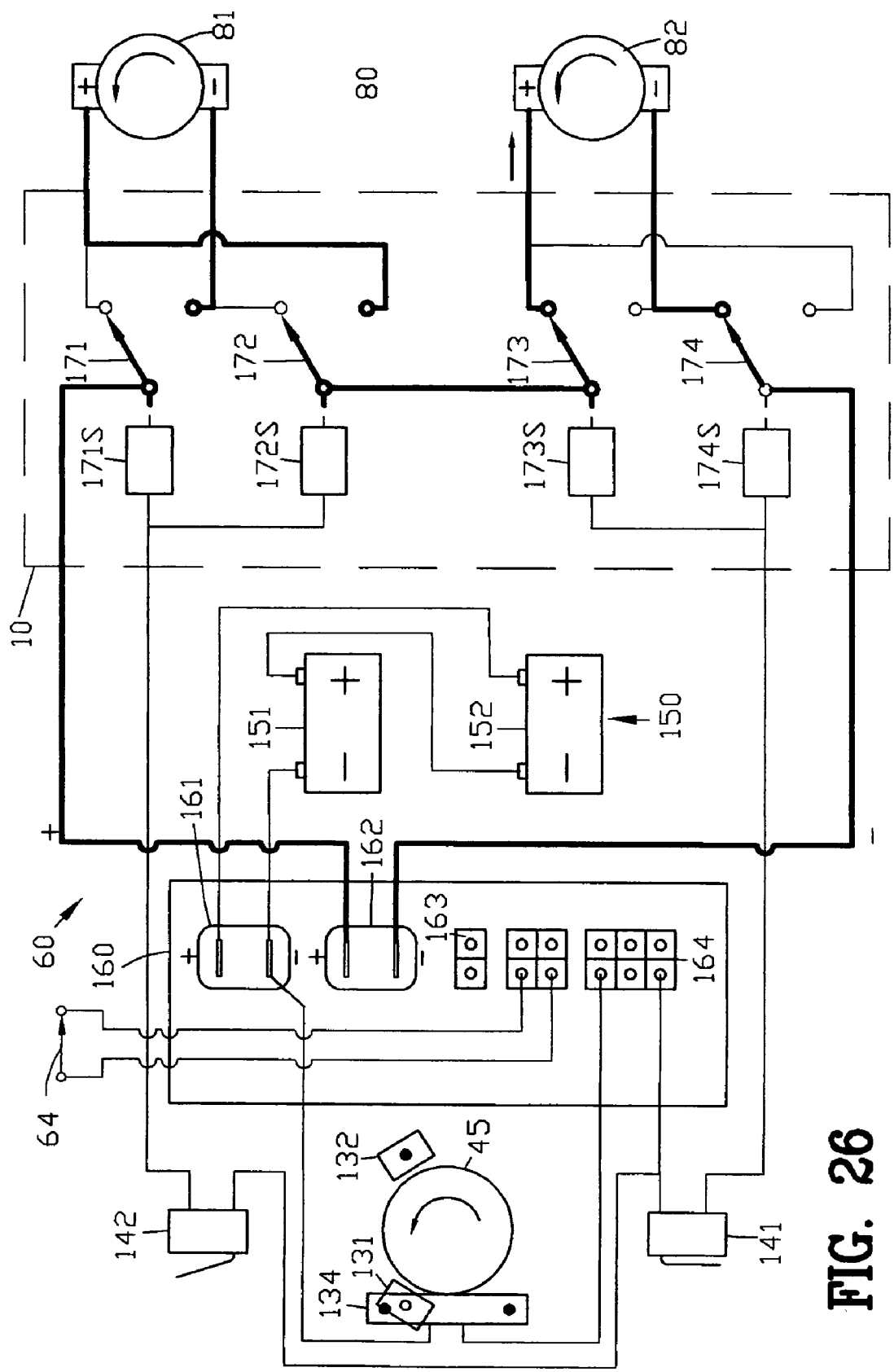
FIG. 26 illustrates the electrical diagram of FIG. 12 when the directional wheel assembly is pivoted into a major right pivoted position and the counter-rotation circuit is disabled.

FIG. 26 illustrates the control circuit 60 when the directional wheels 41 and 42 are positioned in a major left turn position as shown in FIG. 24. The optional disabling switch 64 located on the tiller 50 and/or the handlebar 54 is connected to disable the counter-rotation circuit 10.

When the directional wheels 41 and 42 are pivoted through the minor left turn position, the magnet 134 actuates the first magnetic switch 131 to change the conventional control 160 into a low speed operation. When the directional wheels 41 and 42 are pivoted into the major left turn position, the directional wheels 41 and 42 act as a brake for inhibiting forward and reverse movement of the first frame section 20. In the alternative, the optional brake 66 may inhibit the forward and reverse movement of the first frame section 20.

With the counter-rotation circuit 10 disabled through the optional disabling switch 64, a forward movement of the first and second drive wheels 71 and 72 moves the variable wheelbase mechanism 15 in the retracted position as shown in FIG. 25. Conversely, the reverse movement of the first and second drive wheels 71 and 72 moves the variable wheelbase mechanism 15 into the expanded position as shown in FIG. 24.

Figure 27:
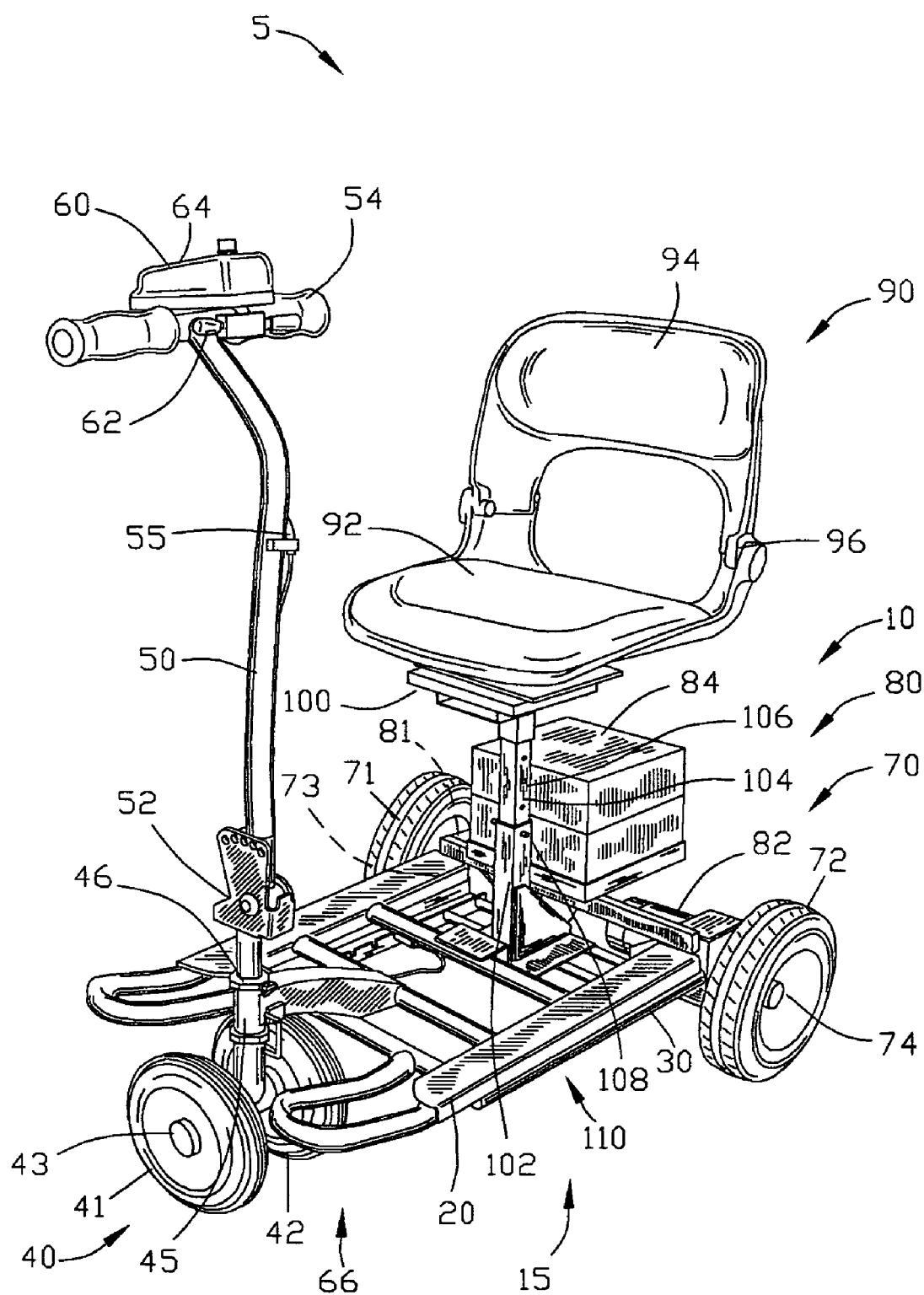
FIG. 27 is an isometric view similar to FIG. 4 with the directional wheel assembly pivoted into major left pivoted position.

FIG. 27 is an isometric view of the vehicle 5 with the variable wheelbase mechanism 15 shown in the retracted position and with the directional wheels 41 and 42 pivoted into the major left turn position. The combination of the counter-rotation circuit 10 and the variable wheelbase mechanism 15 provide unparalleled maneuverability of the vehicle 5.

Figure 28A:
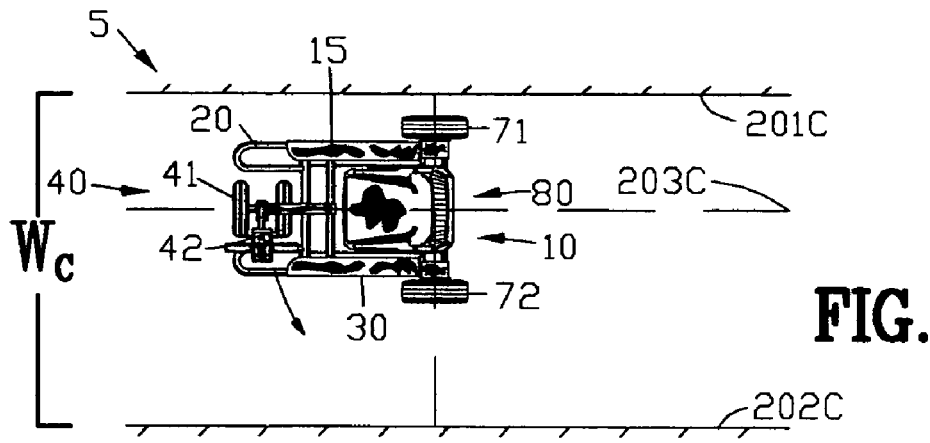
FIG. 28A is a top view of the vehicle of FIG. 27 moving in a direction parallel to opposed barriers.
Figure 28B:
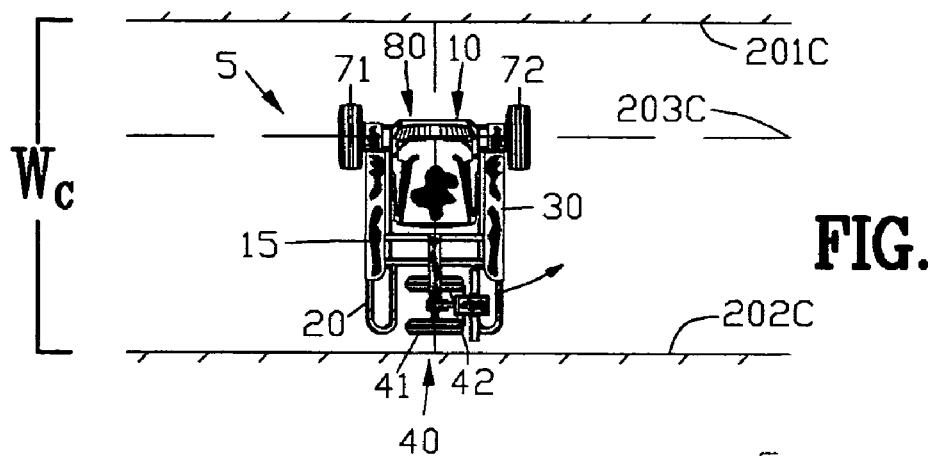
FIG. 28B is a top view similar to FIG. 28A illustrating the vehicle turning between the opposed barriers.
Figure 28C:
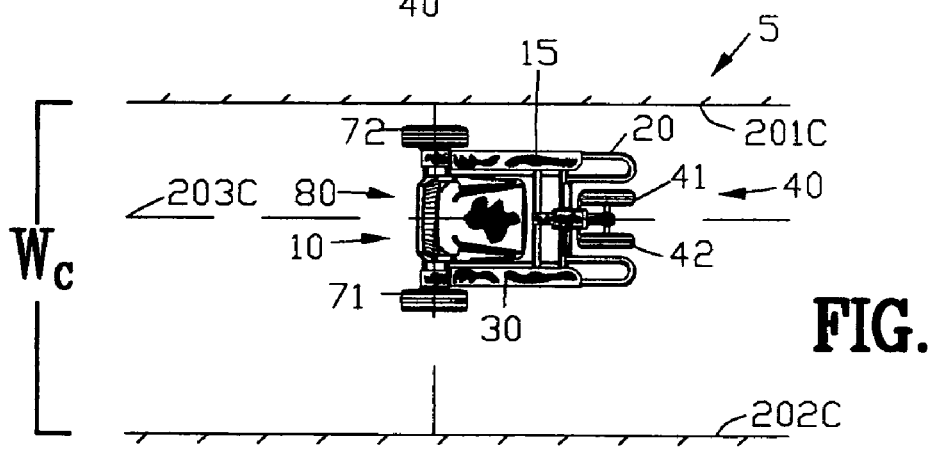
FIG. 28C is a top view similar to FIG. 28A illustrating the vehicle moving in an opposite direction parallel to the opposed barriers.

FIGS. 28A-28C are plan views of the vehicle 5 with the variable wheelbase mechanism 15 shown in the retracted position located between a first and a second barrier 201C and 202C and over a centerline 203C. The first and second barriers 201C and 202C are spaced by a width $W_C$.

FIG. 28A illustrates the vehicle 5 moving along the centerline 203C in a first direction. The vehicle 5 moves in a parallel relationship with the first barrier 201C and in close proximity thereto.

FIG. 28B illustrates the vehicle 5 undertaking a turn between the first and second barriers 201C and 202C. The directional wheels 41 and 42 on the vehicle 5 are positioned in a major left turn position to undertake a 180 degree turn. The vehicle 5 turns about a turning point equidistant between the first and second drive wheels 71 and 72 and superimposed over the centerline 203C.

FIG. 28C illustrates the completion of the turn of 180 degrees by the vehicle 5. The vehicle 5 moves along the centerline 203C in a second and reverse direction. The vehicle 5 moves in a parallel relationship with the first barrier 201C and in close proximity thereto. The vehicle 5 was able to negotiate the 180 degree turn into width $W_C$ between the first and second barriers 201C and 202C.

Figure 29A:
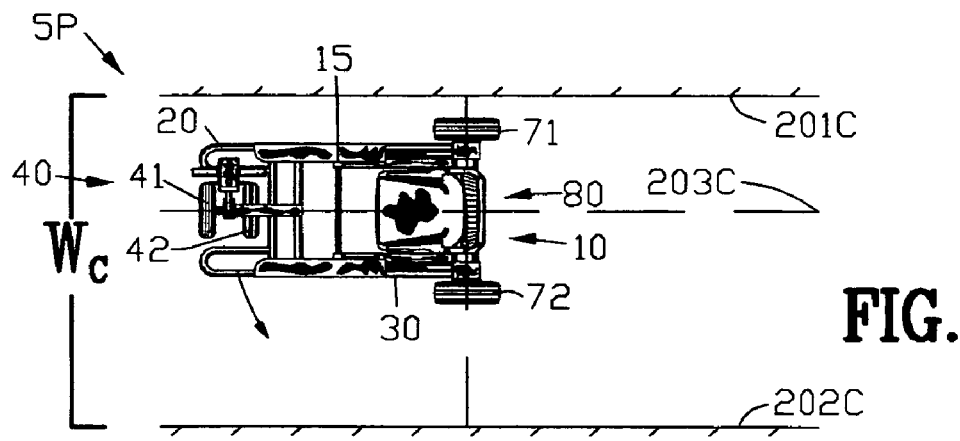
FIG. 29A is a top view of a vehicle of the prior art moving in a direction parallel to the opposed barriers of FIGS. 28A-28C.
Figure 29B:
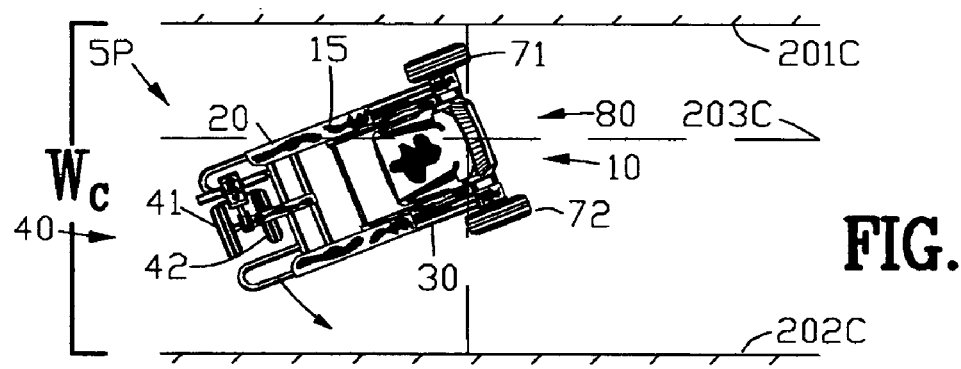
FIG. 29B is a top view similar to FIG. 29A illustrating the vehicle of the prior art beginning a turn between the opposed barriers of FIGS. 28A-28C.
Figure 29C:
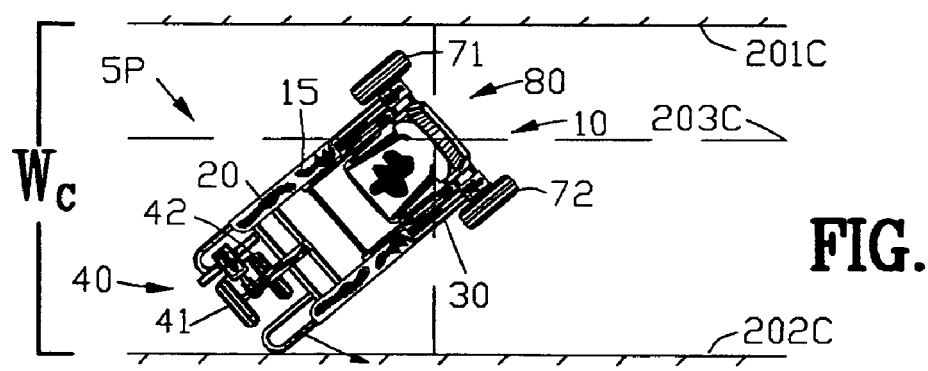
FIG. 29C is a top view similar to FIG. 29B illustrating the vehicle of the prior art failing to turn between the opposed barriers of FIGS. 28A-28C.

FIGS. 29A-29C are plan views of a conventional vehicle 5P of the prior art located between a first and a second barrier 201C and 202C and over a centerline 203C. The conventional vehicle 5P has the same wheelbase as the wheelbase of the vehicle 5 in the retracted position. The conventional vehicle 5P lacks the counter-rotation circuit 10 of the present invention. The first and second barriers 201C and 202C are spaced by the same width $W_C$ as shown in FIGS. 28A-28C.

FIG. 29A illustrates the vehicle 5P moving along the centerline 203C in a first direction. The vehicle 5P moves in a parallel relationship with the first barrier 201C and in close proximity thereto.

FIG. 29B illustrates the vehicle 5P attempting to turn between the first and second barriers 201C and 202C. The directional wheels 41 and 42 on the vehicle 5 are positioned in a major left turn position to undertake a 180 degree turn. With a conventional drive system of the prior art, the vehicle 5P turns about the second wheel 72.

FIG. 29C illustrates the vehicle 5P striking the second barrier 202C. The vehicle 5P was unable to negotiate the 180 degree turn into the same width $W_C$ between the first and second barriers 201C and 202C as the improved vehicle 5 of the present invention shown in FIGS. 23A-28C.

Figure 30:
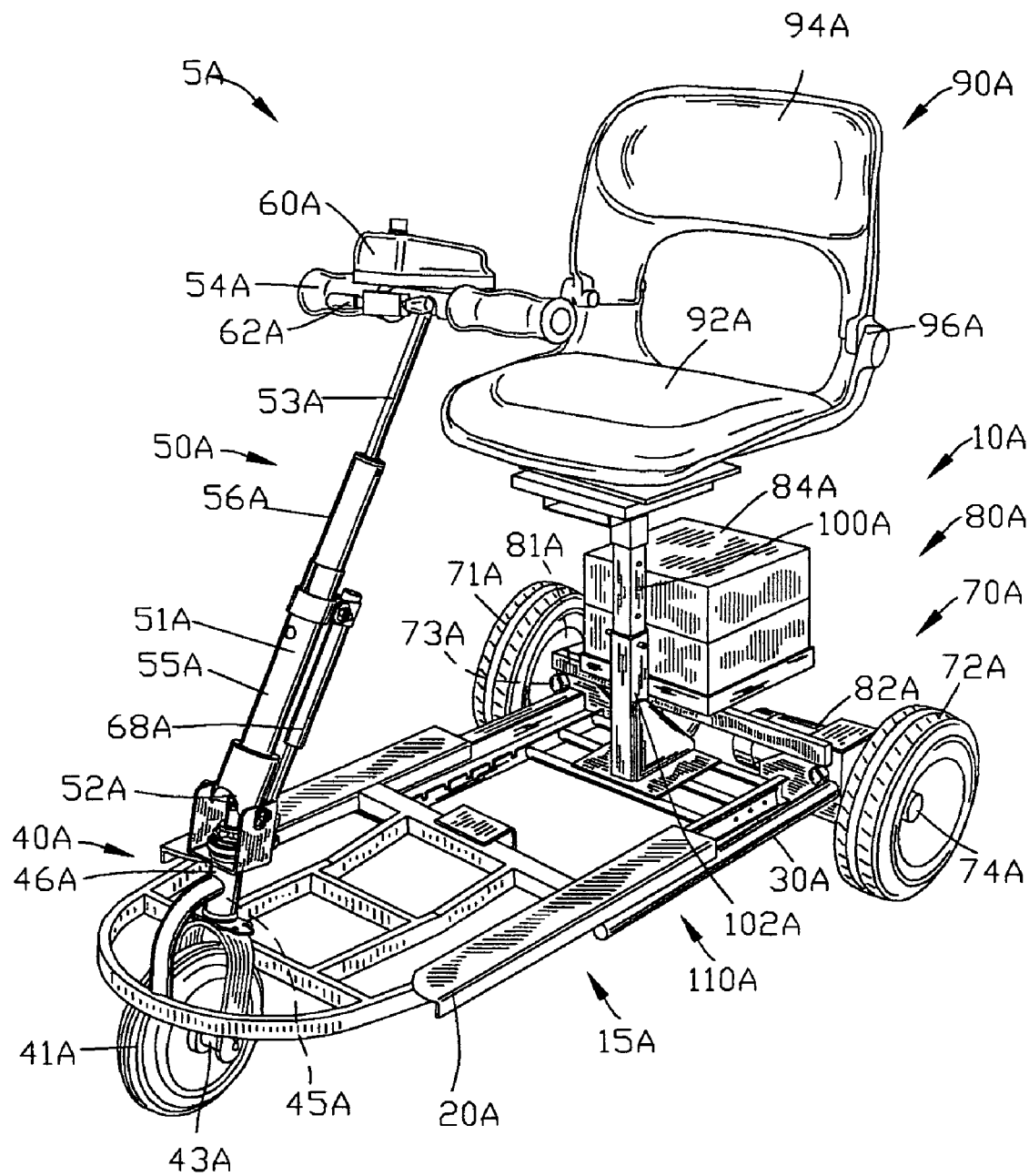
FIG. 30 is an isometric view of a vehicle of a second embodiment of the present invention with a variable wheelbase shown in an extended position and with an improved steering device.
Figure 31:
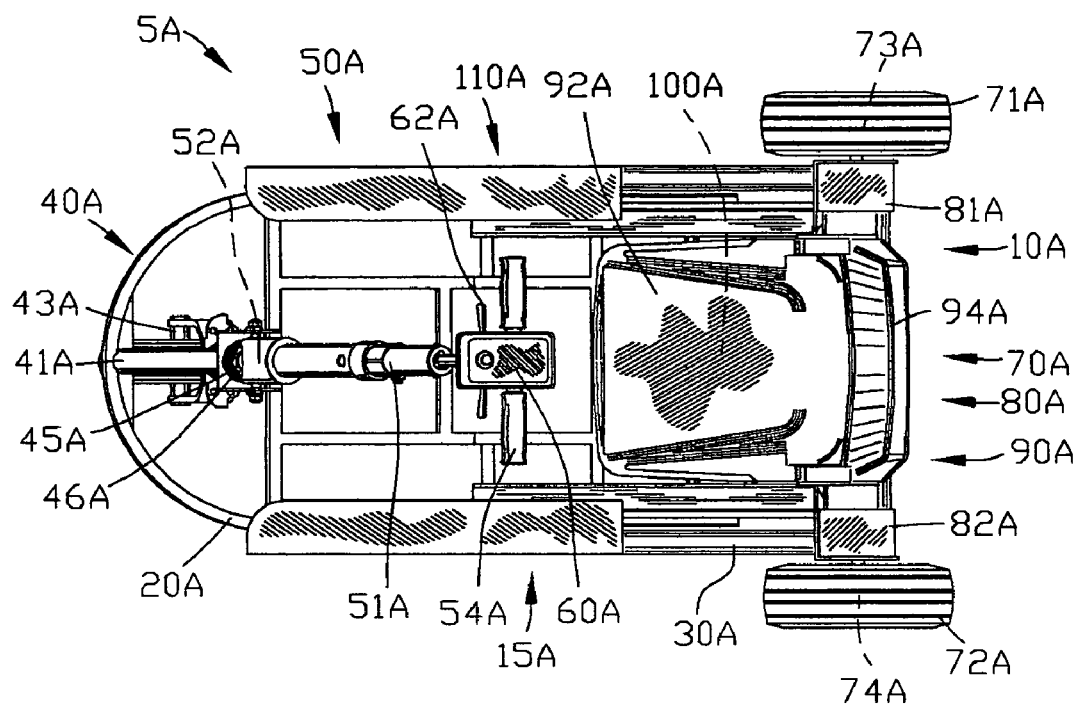
FIG. 31 is a top view of FIG. 30.
Figure 32:
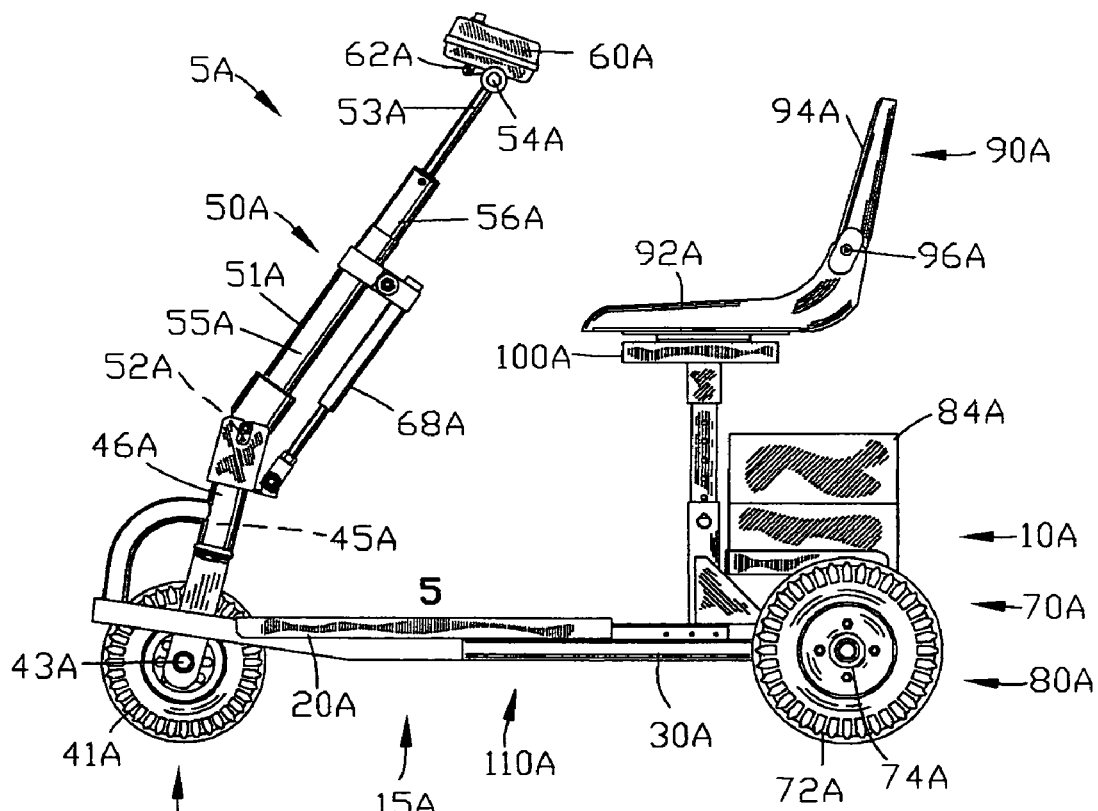
FIG. 32 is a side view of FIG. 31.

FIGS. 30-32 illustrate a vehicle 5A incorporating the counter-rotating drive unit 10A, a variable wheelbase mechanism 15A and an improved steering device 50A of the present invention. The personal mobility vehicle 5A comprises a first frame section 20A and the second frame section 30A. The variable wheelbase mechanism 15A interconnects the first frame section 20A to the second frame section 30A in a manner similar to FIGS. 1-3. The first flame section 20A comprises a directional wheel assembly 40A having the improved steering device 50A and a control 60A. The second frame section 30A comprises a drive wheel assembly 70A powered by a drive unit 80A and a seat assembly 90A.

The directional wheel assembly 40A comprises a single wheel 41A pivotably mounted relative to the first frame section 20A for controlling the direction of movement of the personal mobility vehicle 5A. The directional wheel 41A is mounted on an axle 43A. The axle 43A is supported by an axle mounting shown as fork 44A with a pivot 45A being mounted within a pivot journal 46A. Although the directional wheel assembly 40A has been shown with a single wheel 41A, it should be understood that the directional wheel assembly 40A may comprise plural wheels 41 and 42 shown in FIGS. 1-3.

The steering device 50A comprises a steering rod assembly 51A connected to the pivot 45A by a steering coupling 52A. The steering rod assembly 51A includes a steering rod 53A supporting a steering member shown as a steering bar 54A for enabling an operator to pivot the directional wheel 41A about the pivot 45A. As will be described in greater detail hereinafter, a movement of the steering bar 54A by the operator causes movement of the directional wheel 41A to alter the direction of the personal mobility vehicle 5A.

A control circuit 60A is connected to a plurality of controls and switches conveniently located on the steering bar 54A. The controls circuit 60A is connected to a speed control lever 62A for controlling the speed and the forward and reverse direction of the personal mobility vehicle 5A. The drive wheel assembly 70A comprises a first and a second drive wheel 71A and 72A rotatably mounted on axles 73A and 74A, respectively. A drive unit 80A is connected to the drive wheel assembly 70A to power the first and second drive wheels 71A and 72A. In this example, the drive unit 80A comprises a first and a second drive motor 81A and 82A secured to the second frame section 30A for supporting the first and second drive wheels 71A and 72A through the axles 73A and 74A. The drive unit 80A includes a rechargeable battery 84A for powering first and second drive motors 81A and 82A through the control circuit 60A.

A seat assembly 90A is secured to the second frame section 30A of the personal mobility vehicle 5A by a seat connector 100A secured to a socket 102A in a manner similar to FIGS. 1-6. The seat assembly 90A comprises a seat base 92A and a backrest 94A pivotably mounted to the seat base 92A by a pivot 96A. The seat base 92A is supported on the seat connector 100A for enabling an operator to be seated on the seat base 92A with the feet of the operator positioned on the first frame section 20A. The seat base 92A is positioned with the weight of the operator located just forward of the first and second drive wheels 71A and 72A. The variable wheelbase mechanism 15A enables the operator to vary the wheelbase between the directional wheels 41A and 42A and the first and second drive wheels 71A and 72A by the movement of the hands of the operator and/or by the movement of the feet of the operator.

Figure 33:
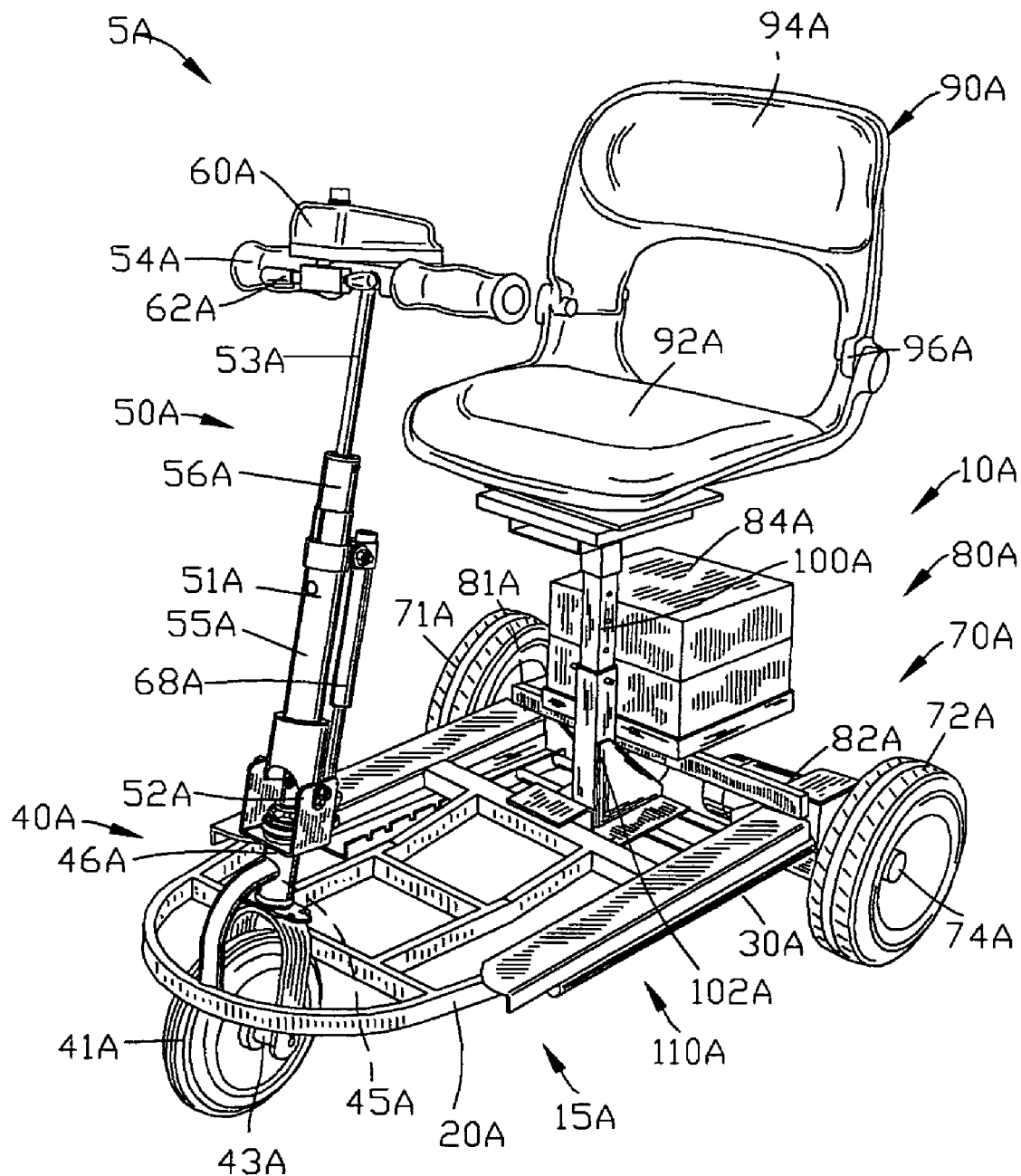
FIG. 33 is an isometric view of the vehicle of FIG. 30 with the variable wheelbase shown in a retracted position.
Figure 34:
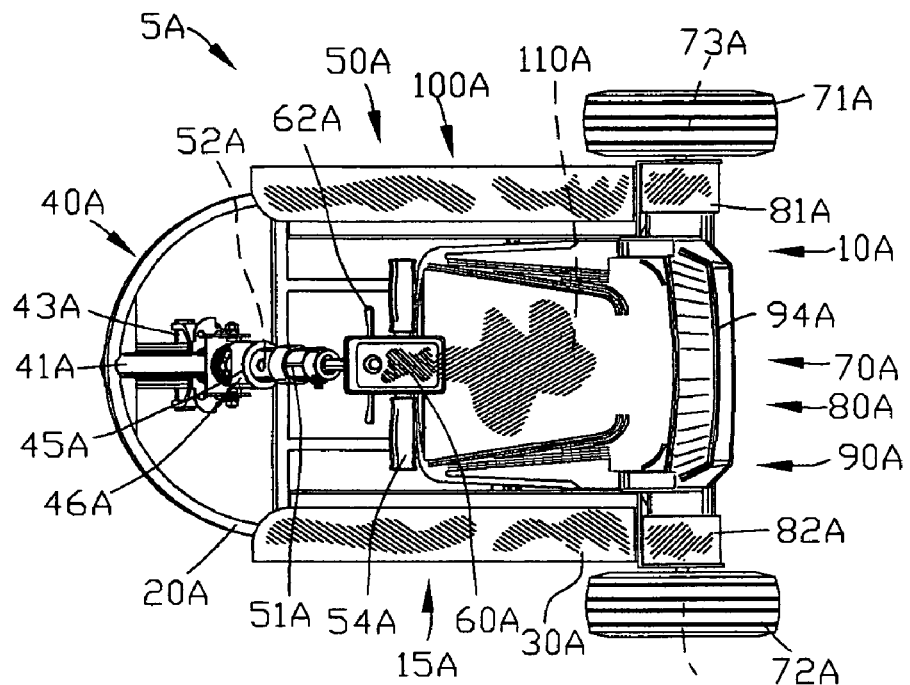
FIG. 34 is a top view of FIG. 33.
Figure 35:
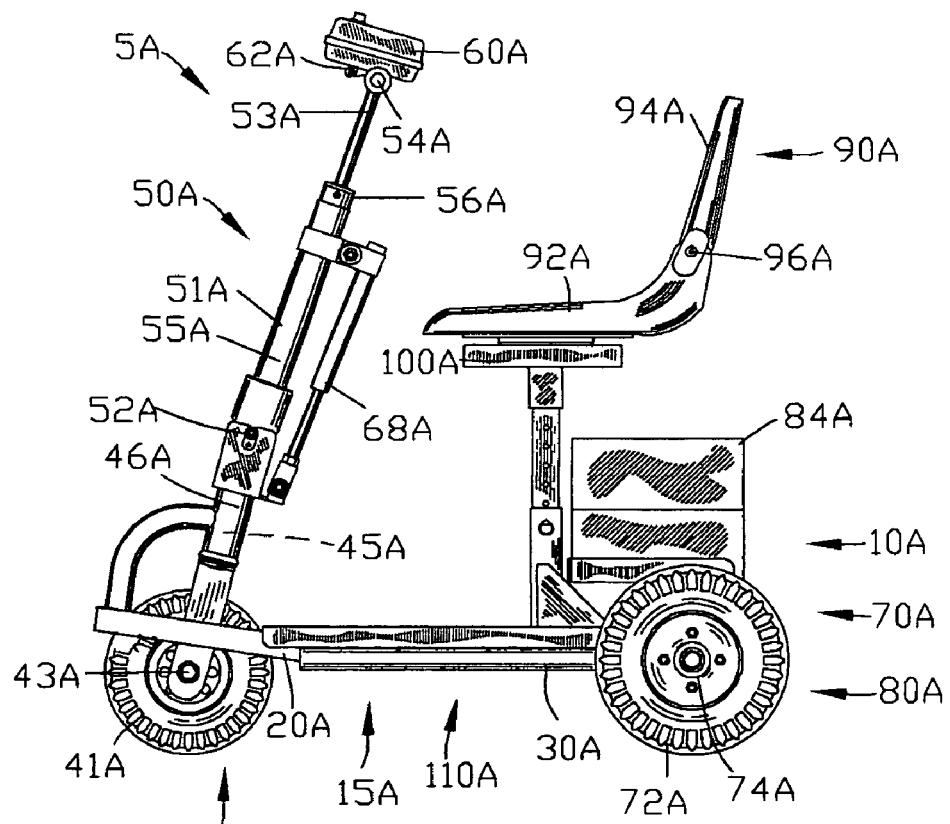
FIG. 35 is a side view of FIG. 33.

FIGS. 33-35 illustrate the vehicle 5A with the variable wheelbase mechanism 15A shown in the retracted position. The variable wheelbase mechanism 15A comprises a slide mechanism 110A interconnecting the first frame section 20A to the second frame section 30A in a manner similar to FIGS. 4-6. The variable wheelbase mechanism 15A enables the directional wheel assembly 40A to move relative to the drive wheel assembly 70A for varying the wheelbase of the personal mobility vehicle 5A.

Preferably, the control circuit 60A includes a counter-rotation circuit 10A in a manner similar to FIGS. 1-21. The control circuit 60A includes appropriate sensors and/or switches (not shown) for sensing a minor turn and a major turn of the directional wheel 41A.

The control circuit 60A provides a low speed operation to the first and second wheels 71A and 72A upon a minor turn of the directional wheel 41A. This low speed operation contributes to the stability of the vehicle 5A during the turning of the vehicle 5A.

The counter-rotation circuit 10A provide a counter-rotation to the first and second wheels 71A and 72A upon a major turn of the directional wheel 41A. The counter-rotation of the first and second wheels 71A and 72A results in the vehicle 5A turning about point between the first and second wheels 71A and 72A.

When the directional wheel 41A is positioned in a minor turn position, the first and second wheels 71A and 72A of the vehicle 5A operate in a low speed operation. As the directional wheel 41A is moved through the minor turn position into the major turn position, the first and second wheels 71A and 72A of the vehicle 5A operate in the low speed operation and in the counter-rotation operation.

The retracted position of the variable wheelbase mechanism 15A in combination with the low speed operation and the counter-rotation of the first and second wheels 71A and 72A provide unparalleled maneuverability of the vehicle 5A As will be described in greater detail hereinafter, the improved steering device 50A of the present invention, further improves the stability and safe operation of the vehicle 5A.

Figures 36, 37:
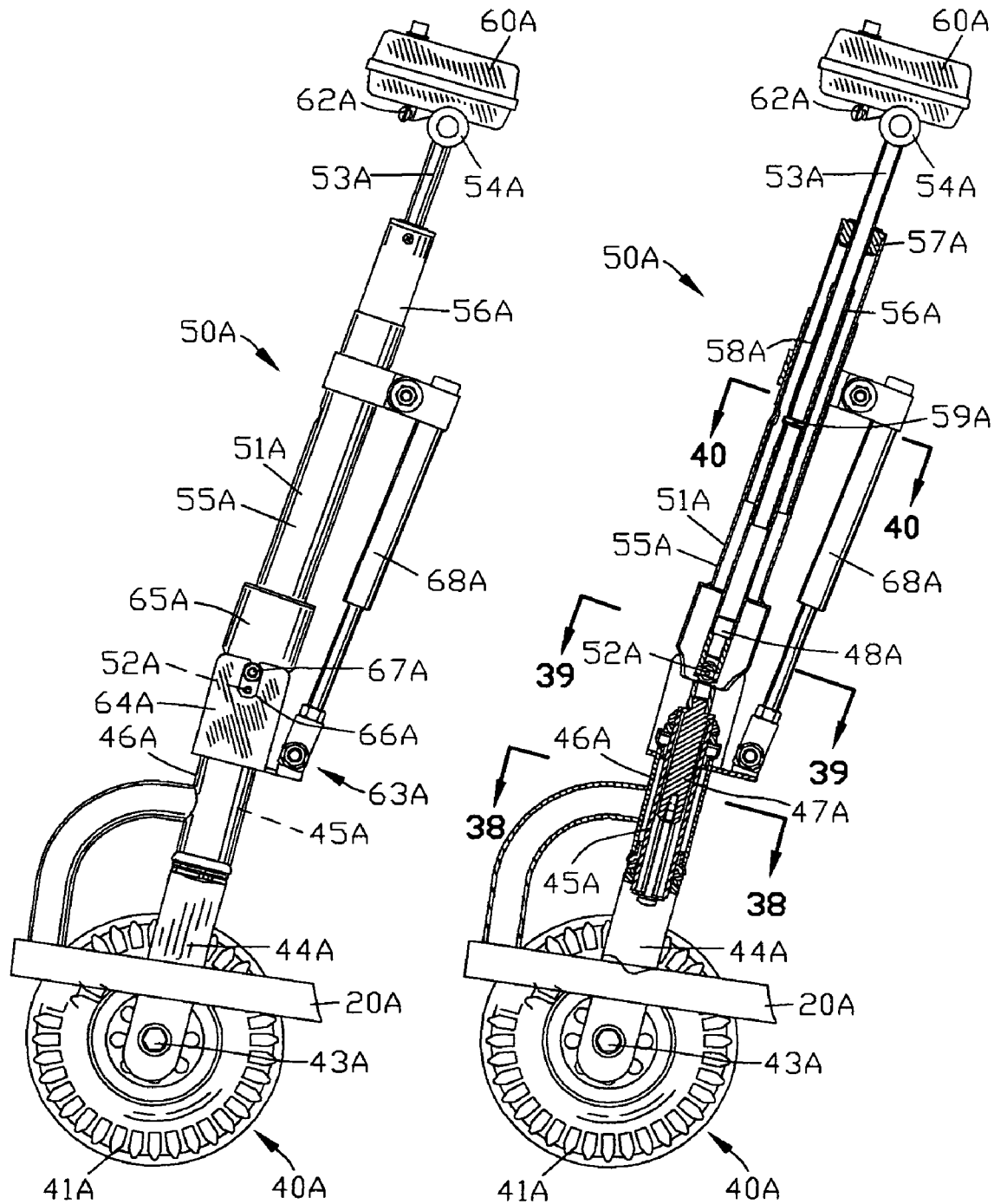
FIG. 36 is an enlarged view of a portion of FIG. 30.
FIG. 37 is a sectional view of FIG. 36.
Figure 38:
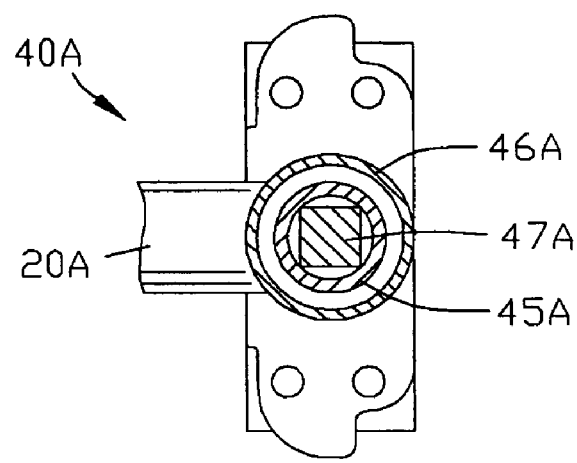
FIG. 38 is a sectional view along line 38-38 in FIG. 37.
Figure 39:
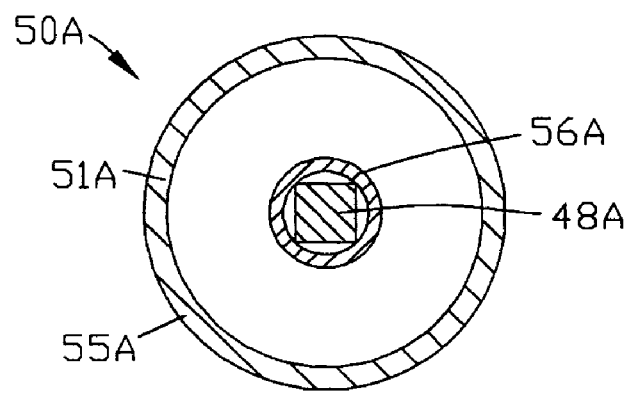
FIG. 39 is a sectional view along line 39-39 in FIG. 37.
Figure 40:
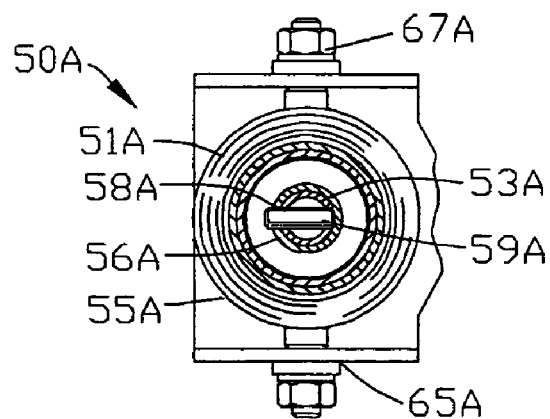
FIG. 40 is a sectional view along line 40-40 in FIG. 37.

FIG. 36 is an enlarged view of a portion of FIG. 30 illustrating a tilt coupling 63A for enabling the improved steering device 50A to be tilted relative to the vehicle 5A. The tilt coupling 63A comprises a lower tilt coupling member 64A secured to the first frame section 20A. The lower tilt coupling member 64A includes a tilt groove 65A.

An upper tilt coupling member 66A is secured to the steering rod assembly 51A. The upper tilt coupling member 66A includes a tilt pin 67A. The tilt pin 67A of the upper tilt coupling member 66A is received within the tilt groove 65A of the lower tilt coupling member 64A for varying the angular position of a steering housing 55A of the steering rod assembly 51A relative to the first frame section 20. A tilt cylinder 68A extends between the lower tilt coupling member 64A and the steering rod assembly 51A for maintaining the tilted position of the steering rod assembly 51A relative to the first and second flame section 20A and 30A. The tilt cylinder 68A maybe either a pneumatic or a hydraulic cylinder for maintaining the tilted position of the steering rod assembly 51A.

FIGS. 37-40 are enlarged sectional views of a portion of FIG. 30 further illustrating the improved steering device 50A. The directional wheel 41A is rotatable mounted on the axle 43A extending between opposed legs of a fork 44A. The pivot 45A is connected to the fork 44A for pivotably mounting the directional wheel 41A relative to the journal 46A secured to the first frame section 20A.

The improved steering device 50A includes a lower keyed connector 47A and an upper keyed connector 48. The lower keyed connector 47A secures the pivot 45A to a lower end of the universal joint 52A. The upper keyed connector 48 secures the universal joint 52A to a steering sleeve 56A. The steering sleeve 56A is surrounded and supported by the steering housing 55A.

The steering sleeve 56A is adapted to slidably receive the steering rod 53A. The steering sleeve 56A includes a sleeve slot 58A extending along a portion of the longitudinal length of the steering sleeve 56A. The steering rod 53A includes a pin 59A extending outward from the steering rod 53A. The pin 59A is slidably received within the sleeve slot 58A extending along the longitudinal length of the steering sleeve 56A. The movement of the pin 59A within the sleeve slot 58A limits the longitudinal movement of the steering rod 53A within the steering sleeve 56A.

Figure 41:
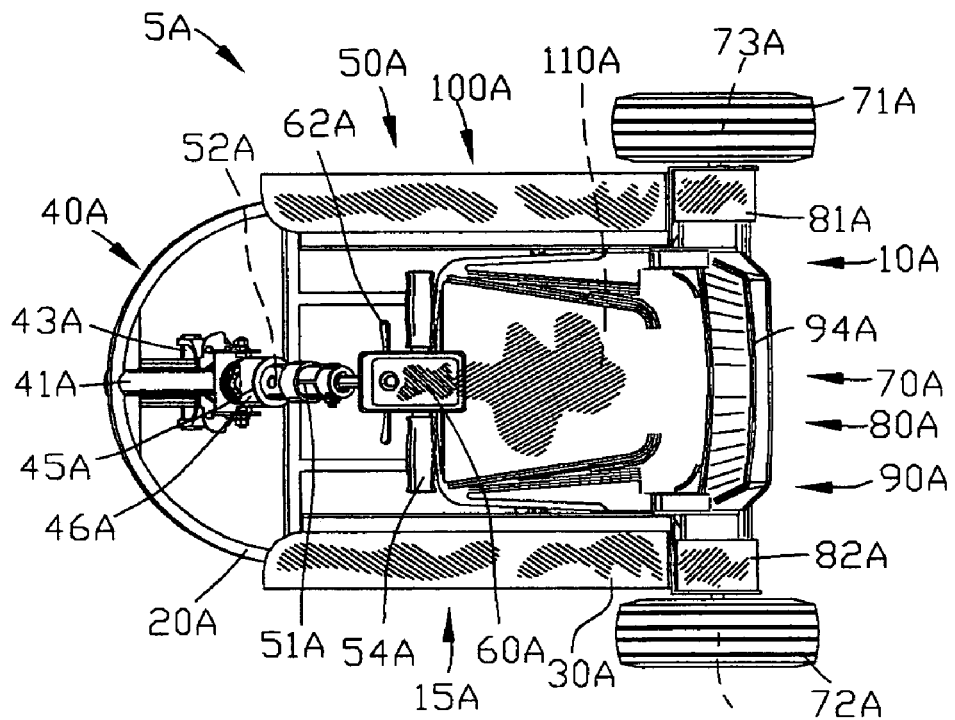
FIG. 41 is a top view similar to FIG. 34 with a directional wheel in a forward position.

FIG. 41 is a top view similar to FIG. 34 with the steering bar 54A positioned perpendicular to a centerline extending between the first and second wheels 71A and 72A. The directional wheel 41A is position to be in alignment with a centerline extending between the first and second wheels 71A and 72A for moving the personal mobility vehicle 5A in a forward direction.

Figure 42:
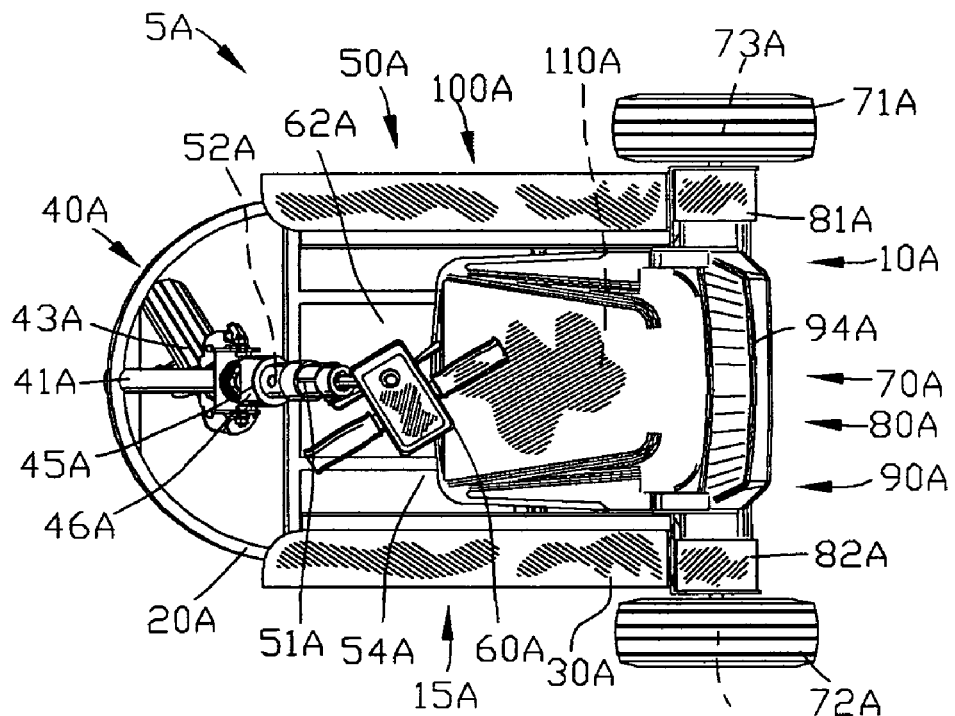
FIG. 42 is a top view similar to FIG. 41 with a directional wheel in a turning position.

FIG. 42 is a top view similar to FIG. 41 with the steering bar 54A rotated in a clockwise direction. A clockwise rotation of the steering bar 54A results in a clockwise pivoting of the directional wheel 41A. The clockwise rotation of the steering bar 54A is translated through the rotation of the steering rod 53A, the rotation of the steering sleeve 56A and the rotation of the universal joint 52A for pivoting the pivot 45A with the journal 46A. The pivoting of the pivot 45A with the journal 46A results in the pivoting of the fork 44A to pivot the directional wheel 41A. Conversely, a counterclockwise rotation of the steering bar 54A results in a counterclockwise pivoting of the directional wheel 41A.

Figure 43:
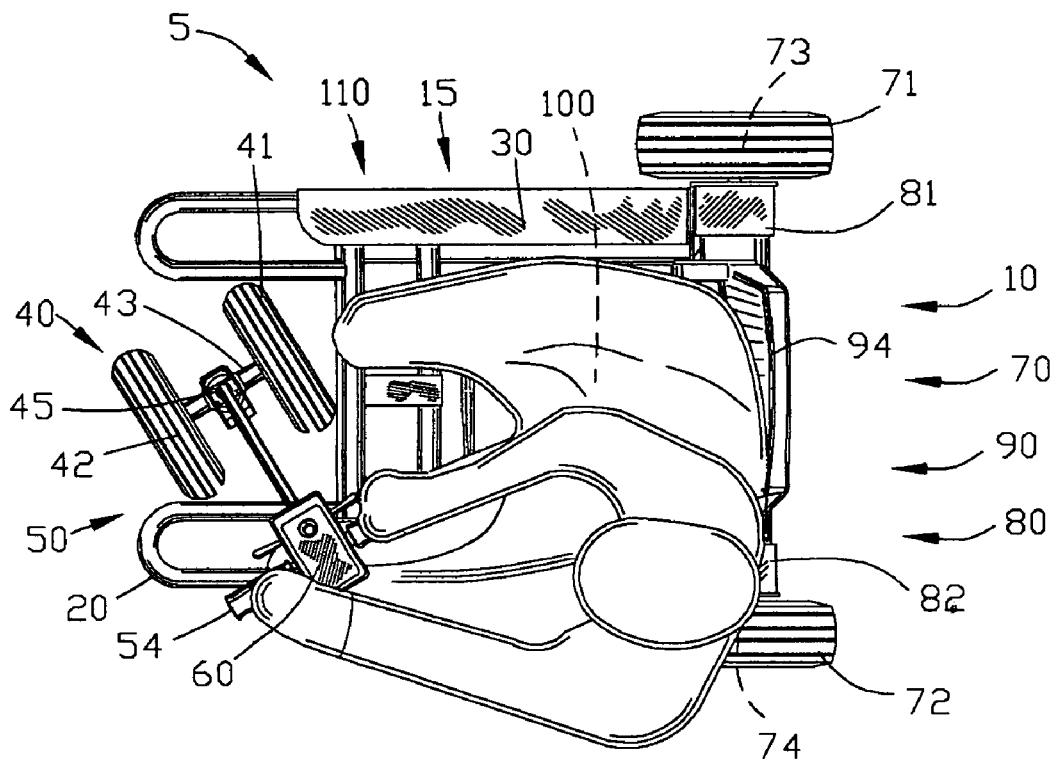
FIG. 43 is a top view of the vehicle of FIG. 5 illustrating an operator turning the vehicle.

FIG. 43 is a top view of the vehicle 5 of FIG. 5 illustrating an operator turning the vehicle 5 to the right in FIG. 43. The vehicle 5 utilizes a tiller 50 for turning the directional wheels 41 and 42 to alter the direction of the personal mobility vehicle 5. The operator moves the tiller 50 to the left to alter the direction of the personal mobility vehicle 5 to the right. As operator moves the tiller to the left, the operator leans to the left from the centerline between the first and second wheels 71 and 72. The undesired left leaning of the operator for a right turn of the personal mobility vehicle 5 reduces the stability of the personal mobility vehicle 5. The undesired left leaning of the operator is opposite from a desired right leaning of the operator for a right turn of the personal mobility vehicle 5.

Figure 44:
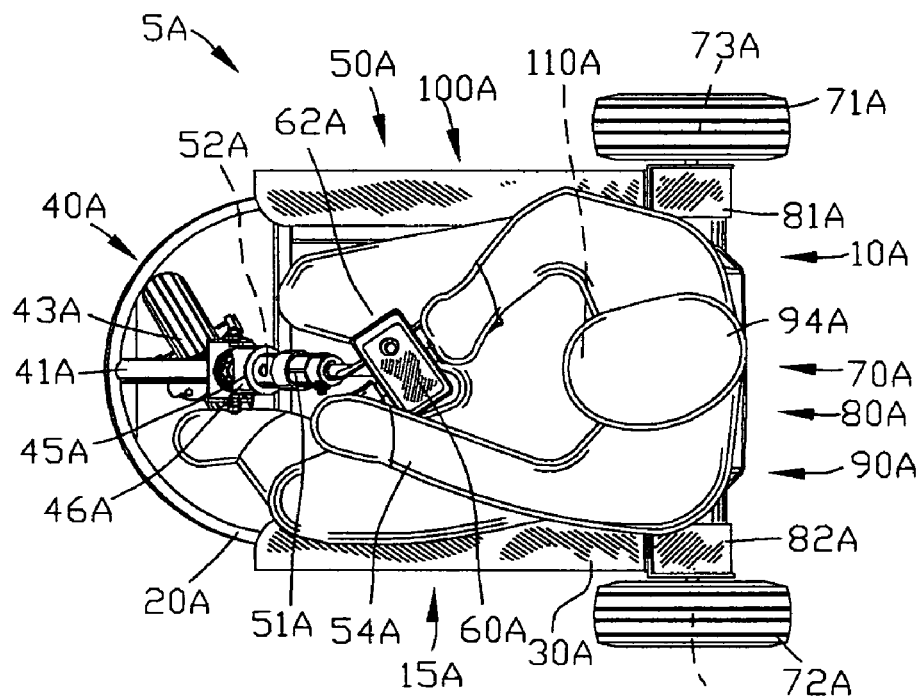
FIG. 44 is a top view of the vehicle of FIG. 42 illustrating an operator turning the vehicle.

FIG. 44 is a top view of the vehicle 5A of FIG. 42 illustrating an operator turning the vehicle 5A to the right in FIG. 44. The vehicle 5A utilizes an improved steering device 50A for turning the directional wheel 41A to alter the direction of the personal mobility vehicle 5A. The operator rotates the steering bar 54A in a clockwise direction to alter the direction of the personal mobility vehicle 5A to the right. As operator rotates the steering bar 54A in a clockwise direction, the operator may lean to the right from the centerline between the first and second wheels 71A and 72A. The desired right leaning of the operator for a right turn of the personal mobility vehicle 5A enhances the stability of the personal mobility vehicle 5A.

Figure 45:
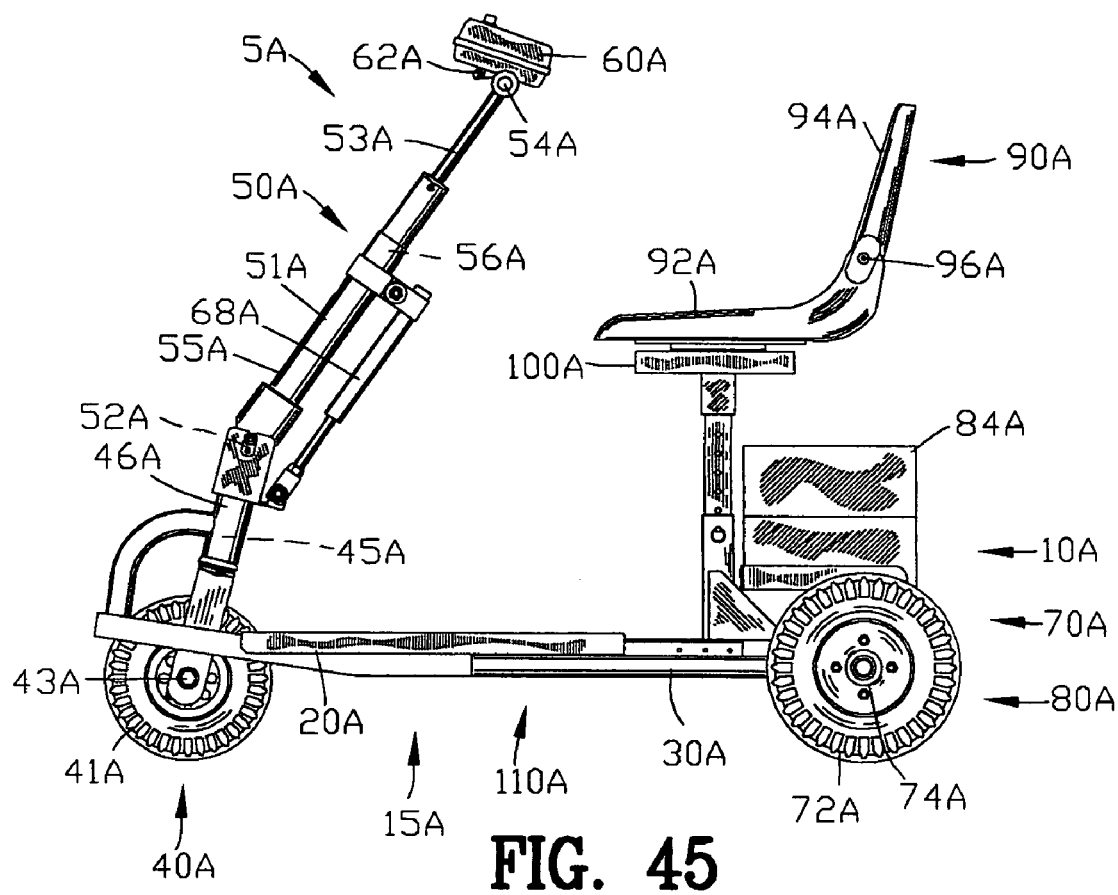
FIG. 45 is a side view of the vehicle of FIG. 32 illustrating the improved steering device in an extended position.

FIG. 45 is a side view of the vehicle 5A of FIG. 32 illustrating the improved steering device 50A in an extended position. The steering rod 53A has been extended relative to the steering sleeve 56A to extend the position of the steering bar 54A. The pin 59A of the steering rod 53A moves within the slot 58A of the steering sleeve 56A to position the steering bar 54A in the proper position for an operator. In one example, the bushing 57A provides a sliding frictional engagement for maintaining the position of the steering rod 53A relative to the steering sleeve 56A. In another example, a lock (not shown) may be provided for locking the position of the steering rod 53A relative to the steering sleeve 56A.

Figure 46:
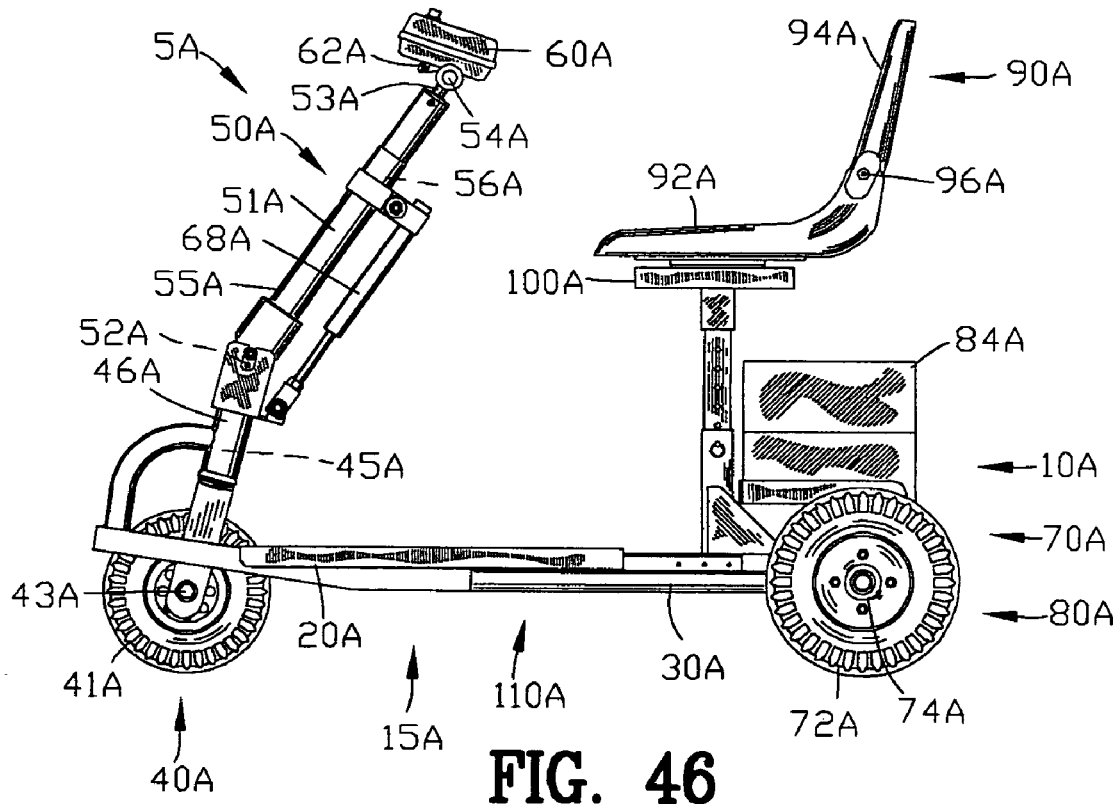
FIG. 46 is a side view of the vehicle of FIG. 32 illustrating the improved steering device in a retracted position.

FIG. 46 is a side view of the vehicle of FIG. 32 illustrating the improved steering device 50A in a retracted position. The steering rod 53A has been retracted relative to the steering sleeve 56A to retract the position of the steering bar 54A. The pin 59A of the steering rod 53A moves within the slot 58A of the steering sleeve 56A to position the steering bar 54A in the proper position for an operator. Preferably, the steering rod 53A is extended and retracted relative to the steering sleeve 56A by a simple hand adjustment of the operator.

Figure 47:
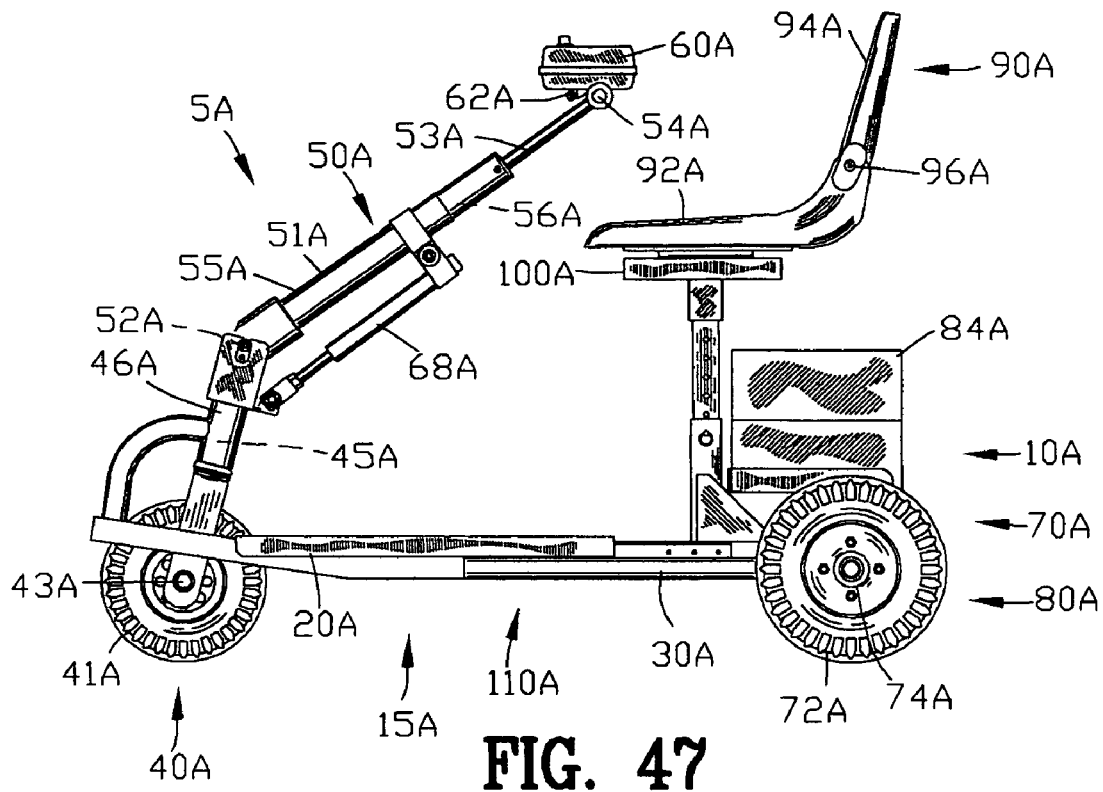
FIG. 47 is a side view of the vehicle of FIG. 32 illustrating the improved steering device another operating position.

FIG. 47 is a side view of the vehicle of FIG. 32 illustrating the improved steering device 50A in an angled operating position. The steering rod assembling 51A has been tilted on the tilt coupling 63A for changing the angle of the steering rod assembling 51A relative to the first and second frame sections 20A and 30A. The tilt cylinder 68A maintains the position of the steering rod assembling 51A relative to the first and second frame sections 20A and 30A. Preferably, the steering rod assembling 51A is tilted relative to the and second frame sections 20A and 30A by a simple hand adjustment of the operator.

Figure 48:
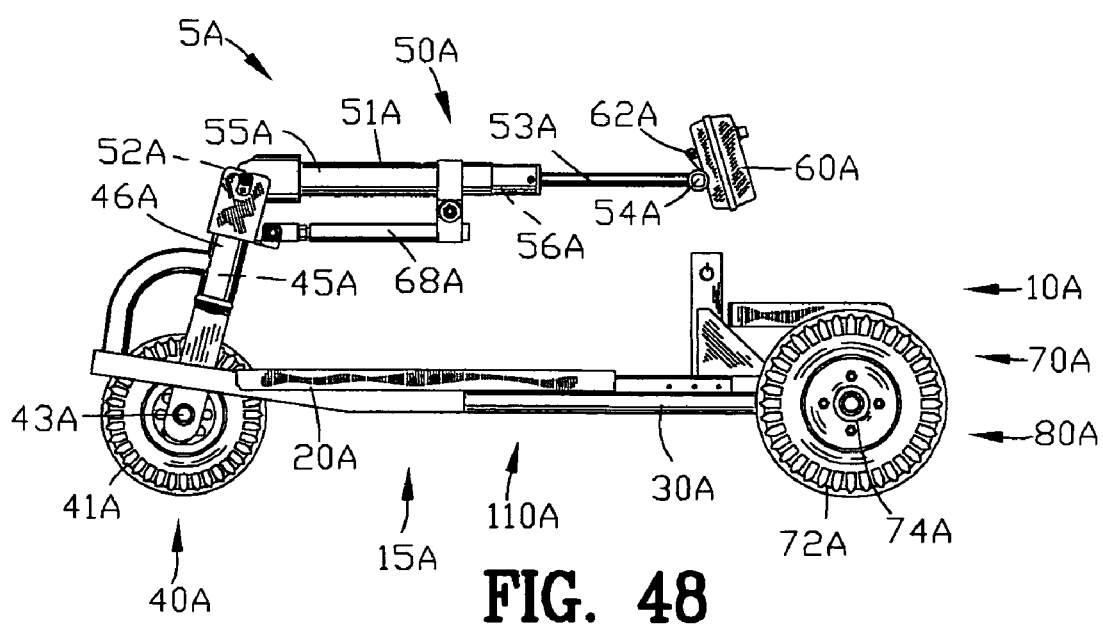
FIG. 48 is a side view of the vehicle of FIG. 32 illustrating the improved steering device in a collapsed non-operating position.

FIG. 48 is a side view of the vehicle of FIG. 32 illustrating the improved steering device 50A in a collapsed non-operating position. The steering rod assembling 51A has been tilted on the tilt coupling 63A into a collapsed non-operating position for transportation and/or storage.

The conventional control circuit 160 may be characterized as scooter controller for simultaneously driving dual wheels in unison through a single drive axle and a single motor. In contrast, a control circuit for a power wheelchair individually drives plural wheels through plural drive axles and plural motors. The control circuit for a power wheelchair is substantially more expensive than a scooter controller.

The counter-rotation circuit 10 enables the vehicle 5 of the present invention to individually drive plural wheels through plural motors utilizing a conventional control circuit 160 designed to drive dual wheels through a single motor. The use of the counter-rotation circuit 10 provides a substantial saving over a control circuit for a power wheelchair. Although the counter-rotation circuit 10 has been shown as a separate unit from the conventional control circuit 160, it should be appreciated that the counter-rotation circuit 10 may be incorporated within the control circuit 160.

The foregoing has set forth a personal mobility vehicle having improved maneuverability commensurate with a power wheelchair. Firstly, the personal mobility vehicle includes a variable wheelbase mechanism for varying the distance between the directional wheel assembly and the drive wheels of the personal mobility vehicle. The variable wheelbase mechanism enables the wheelbase of the personal mobility vehicle to be reduced thus decreasing the turning radius of the personal mobile vehicle. Secondly, the personal mobility vehicle includes a counter-rotation circuit for oppositely rotating a first and a second drive wheel upon a major turn of the personal mobility vehicle. The counter-rotation circuit further reduces the turning radius of the personal mobile vehicle. Thirdly, the personal mobility vehicle includes an improved steering assembly to add stability to the personal mobility vehicle during the turning process.

Although the personal mobility vehicle has been disclosed with the three improvements set forth above, it should be understood that each of the improvements set forth above may be implemented individually or combination with one or more of the foregoing improvements as should be understood by those skilled in the art.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A vehicle having a reduced turning radius, comprising:
   a directional wheel assembly for steering the vehicle;
   a first and a second drive wheel for driving the vehicle;
   a first and a second motor connected to said first and second drive wheels, respectively, for independently driving said first and second drive wheels;
   a control circuit connected to said first and second motors for powering said first and second motors for rotating said first and second drive wheels to drive the vehicle; and
   a counter-rotation circuit for reversing power to current flow through one of said first and second motors relative to the other of said first and second motors for counter-rotating said first and second drive wheels upon a major turning position of said directional wheel assembly to enhance the turning of the vehicle.

2. A vehicle having a reduced turning radius as set forth in claim 1, wherein said counter-rotation circuit includes a first and a second switch for reversing the power to said first and second motors, respectively.

3. A vehicle having a reduced turning radius as set forth in claim 1, wherein said counter-rotation circuit reverses the directions of one of said first and second motors relative to the other of said first and second motors when said directional wheel assembly obtains said major pivotable position.

4. A vehicle having a reduced turning radius, comprising:
   a directional wheel assembly for steering the vehicle;
   a first and a second drive wheel for driving the vehicle;
   a first and a second motor for independently driving said first and second drive wheels;
   a control circuit connected to said first and second motors for powering said first and second motors for rotating said first and second drive wheels to drive the vehicle;
   said control circuit being a conventional control for driving a single motor;

a counter-rotation circuit
interposed between said control circuit and said first and second motors;
said counter-rotation circuit comprising first and second switches for connecting said control circuit to said first and second motors, respectively;
said counter-rotation circuit reversing current flow through one of said first and second motors relative to the other of said first and second motors for counter-rotating said first and second drive wheels upon a major turning position of said directional wheel assembly to enhance the turning of the vehicle; and
a position sensor connecting said counter-rotation circuit for reversing the directions of one of said first and second motors relative to the other of said first and second motors when said directional wheel assembly obtains said major pivotable position.

5. A personal mobility vehicle having a reduced turning radius, comprising:
a first and a second frame section;
a directional wheel assembly pivotably mounted on said first frame section for steering the personal mobility vehicle;
a first and a second drive wheel mounted on said second frame section;
a first and a second motor connected to said first and second drive wheels for driving the personal mobility vehicle;
a slide mechanism interconnecting said first frame section and said second frame section for providing a variable wheelbase between said directional wheel assembly and said first and second drive wheels;
a control circuit for powering said first and second motors;
a position sensor for sensing the angular position of said directional wheel assembly;
a reducing circuit connected between said position sensor and said control circuit for reducing the speed of said first and second motors when said directional wheel assembly obtains a minor pivotable position; and
a counter-rotation circuit for counter-rotating said first motor relative to said second motor when said directional wheel assembly obtains a major pivotable position to enhance the turning of the vehicle.

6. A personal mobility vehicle as set forth in claim 5, including a slide mechanism lock for inhibiting movement between said first and second frame sections.

7. A vehicle having a reduced turning radius, comprising:
a directional wheel assembly for steering the vehicle;
a first and a second drive wheel for driving the vehicle;
a first and a second motor connected to said first and second drive wheels, respectively, for independently driving said first and second drive wheels;
a control circuit for powering said first and second motors for rotating said first and second drive wheels to drive the vehicle; and
a counter-rotation circuit connecting said first and second motors in electrical series;
said counter-rotation circuit reversing current flow through one of said first and second motors relative to the other of said first and second motors for counter-rotating said first and second drive wheels to enhance the turning of the vehicle.

8. A vehicle having a reduced turning radius, comprising:
a directional wheel assembly for steering the vehicle;
a first and a second drive wheel for driving the vehicle;
a first and a second motor connected to said first and second drive wheels, respectively, for independently driving said first and second drive wheels;
a control circuit for powering said first and second motors for rotating said first and second drive wheels to drive the vehicle; and
a counter-rotation circuit comprising a first and a second switch connected to said first motor and a third and a fourth switch connect to said second motors connecting said first and second motors in electrical series; and
said counter-rotation circuit changing two of said switches for reversing current flow through one of said first and second motors relative to the other of said first and second motors for counter-rotating said first and second drive wheels for enhancing the turning of the vehicle.

9. A personal mobility vehicle having a reduced turning radius, comprising:
a first and a second frame section;
a directional wheel assembly pivotably mounted on said first frame section for steering the personal mobility vehicle;
a first and second drive wheel mounted on said second frame section;
a first and a second motor connected to said first and second drive wheels for driving the personal mobility vehicle, respectively;
a slide mechanism interconnecting said first frame section and said second frame section for providing a variable wheelbase between said directional wheel assembly and said first and second drive wheels;
a control circuit for powering said first and second motors for rotating said first and second drive wheels to drive the vehicle;
a position sensor for sensing the angular position of said directional wheel assembly;
a reducing circuit connected between said position sensor and said control circuit for reducing the speed of said first and second motors when said directional wheel assembly obtains a minor pivotable position; and
a counter-rotation circuit comprising a first and a second switch connected to said first motor and a third and a fourth switch connect to said second motors connecting said first and second motors in electrical series; and
said position sensor connected to said counter-rotation circuit for changing two of said switches for reversing current flow through one of said first and second motors relative to the other of said first and second motors when said directional wheel assembly obtains said major pivotable position for counter-rotating said first and second drive wheels for enhancing said turning of said vehicle.

* * * * *